US008802039B2

(12) United States Patent
Neagle et al.

(10) Patent No.: US 8,802,039 B2
(45) Date of Patent: Aug. 12, 2014

(54) MICROCHANNEL TECHNOLOGY HAVING STRUCTURES WITH REDUCED MATERIAL AND ENHANCED VOLUMETRIC PRODUCTIVITY

(75) Inventors: Paul W. Neagle, Westerville, OH (US); Anna Lee Tonkovich, Dublin, OH (US); Soumitra Deshmukh, Dublin, OH (US); Ravi Arora, New Albany, OH (US)

(73) Assignee: Velocys, Inc., Plain City, OH (US)

( * ) Notice: Subject to any disclaimer, the term of this patent is extended or adjusted under 35 U.S.C. 154(b) by 1202 days.

(21) Appl. No.: 12/642,766

(22) Filed: Dec. 18, 2009

(65) Prior Publication Data

US 2011/0147665 A1    Jun. 23, 2011

(51) Int. Cl.
*B01J 8/00* (2006.01)
*B01J 19/00* (2006.01)

(52) U.S. Cl.
USPC .......................................... 422/603; 422/130

(58) Field of Classification Search
CPC ................................ B01J 8/00; B01J 19/0093
USPC .................................................. 422/130, 603
See application file for complete search history.

(56) References Cited

U.S. PATENT DOCUMENTS

| 5,249,359 | A | 10/1993 | Schubert |
| 6,200,536 | B1 | 3/2001 | Tonkovich |
| 6,219,973 | B1 | 4/2001 | Lafferty, III |
| 6,524,488 | B1 | 2/2003 | Insley |
| 7,422,910 | B2 | 9/2008 | Fitzgerald |
| 8,048,383 | B2 | 11/2011 | Tonkovich |
| 8,122,909 | B2 | 2/2012 | Tonkovich |
| 2002/0027101 | A1 | 3/2002 | Insley et al. |
| 2005/0239228 | A1* | 10/2005 | Quenzer et al. ............... 438/29 |
| 2006/0120213 | A1 | 6/2006 | Tonkovich |
| 2007/0017633 | A1* | 1/2007 | Tonkovich et al. .......... 156/300 |
| 2009/0326279 | A1 | 12/2009 | Tonkovich |

FOREIGN PATENT DOCUMENTS

| CH | 680788 A5 | 11/1992 |
| WO | WO2009064490 | 5/2009 |

OTHER PUBLICATIONS

Updated Information disclosure statement (IDS) for U.S. Appl. No. 12/642,766.
International search report for PCT/US2010061395, dated Feb. 8, 2012.
Written opinion of the international searching authority for PCT/US2010061395, dated Jun. 18, 2012.

* cited by examiner

*Primary Examiner* — Walter D Griffin
*Assistant Examiner* — Huy-Tram Nguyen
(74) *Attorney, Agent, or Firm* — Frank Rosenberg

(57) ABSTRACT

Novel designs for microchannel apparatus are described in which microchannels are shaped to reduce the amount of material needed to build an apparatus. In these designs, some microchannels are shaped, in cross-section, to provide relatively more structural material in areas of greatest stress, while leaving greater area for unit operations in areas of the apparatus that are subjected to relatively less stress.

19 Claims, 16 Drawing Sheets

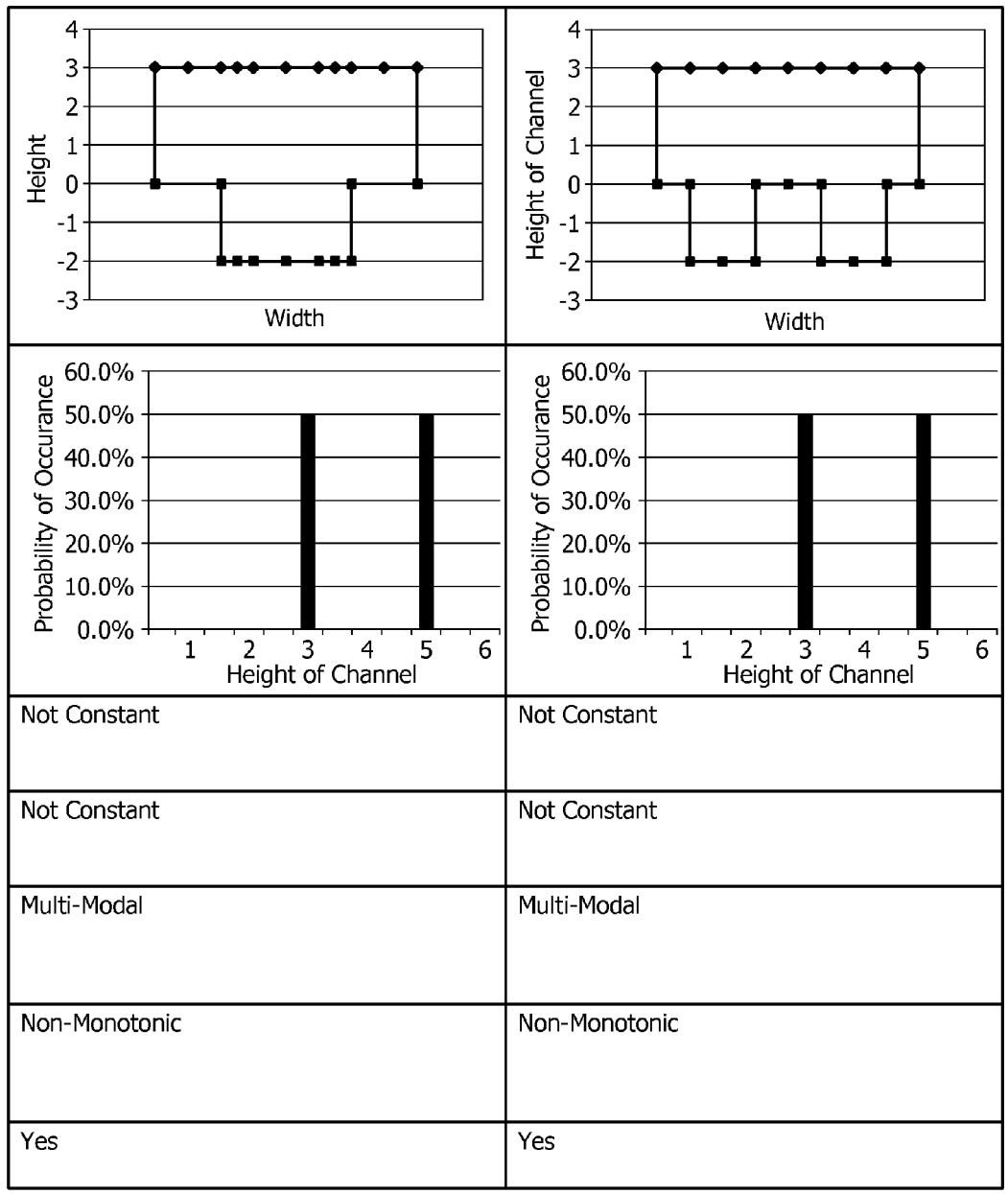
FIG. 3 con'd

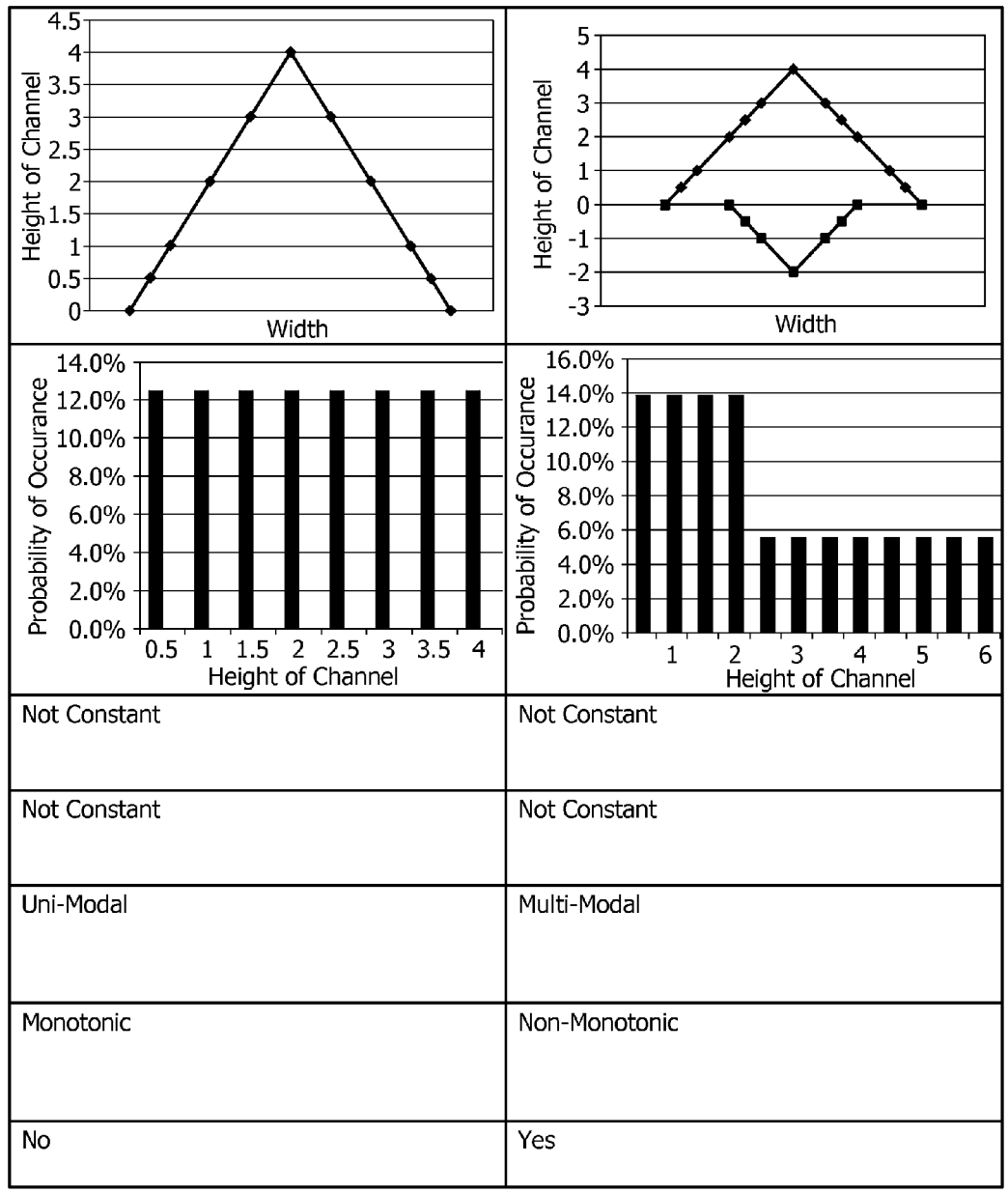
FIG. 3 con'd

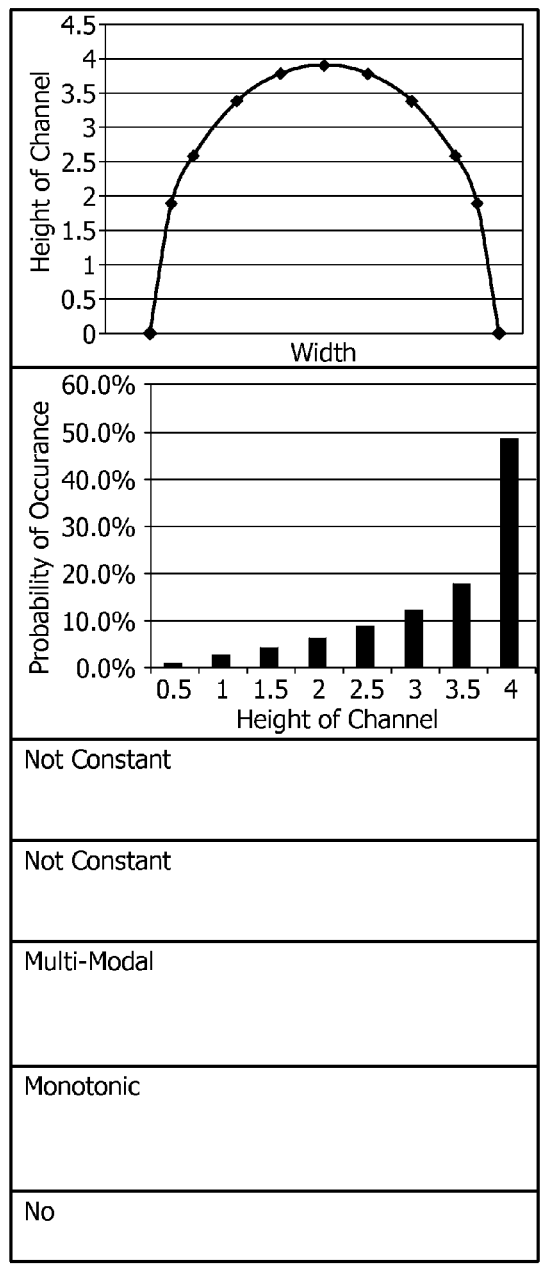
FIG. 3 con'd

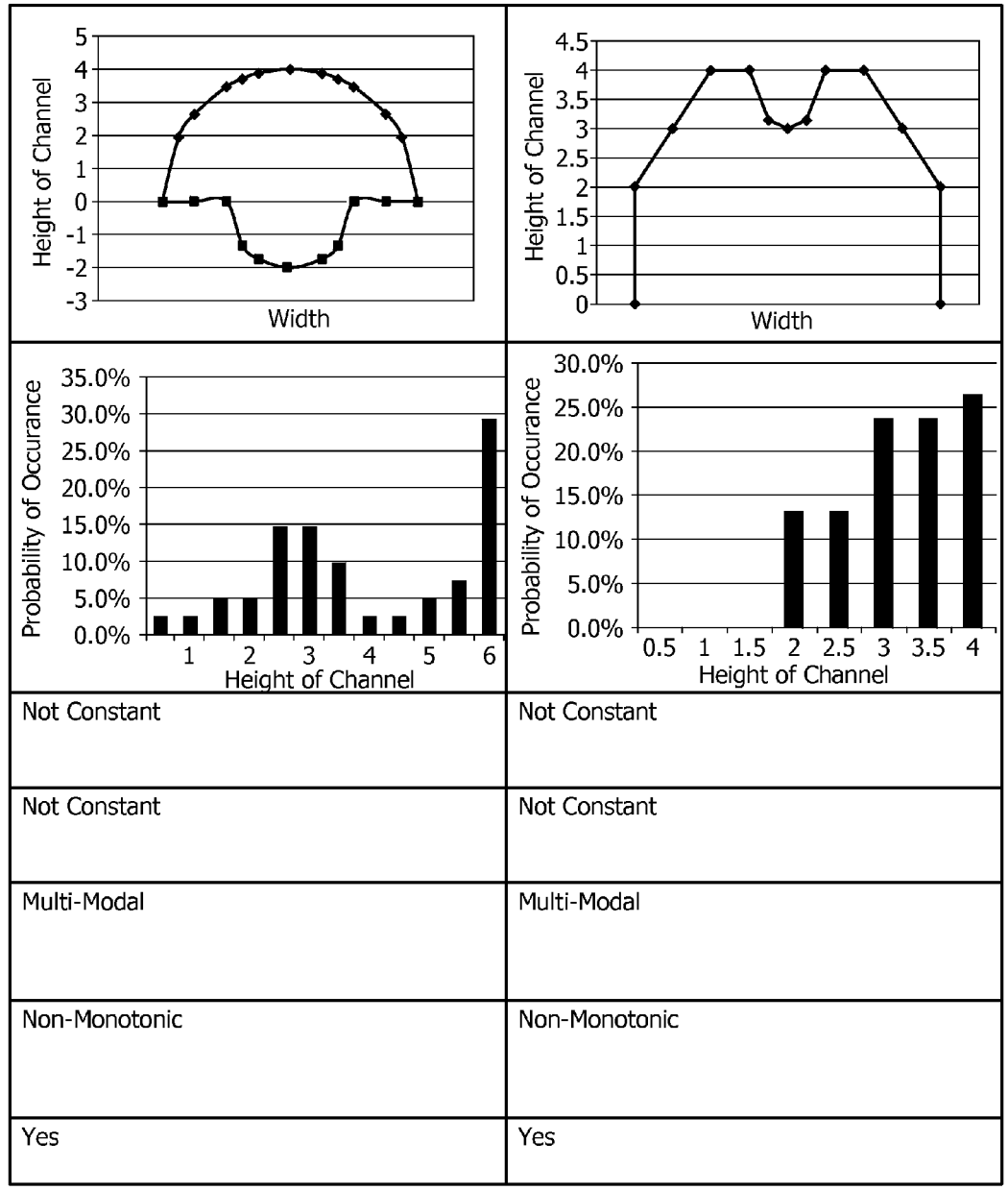
FIG. 3 con'd

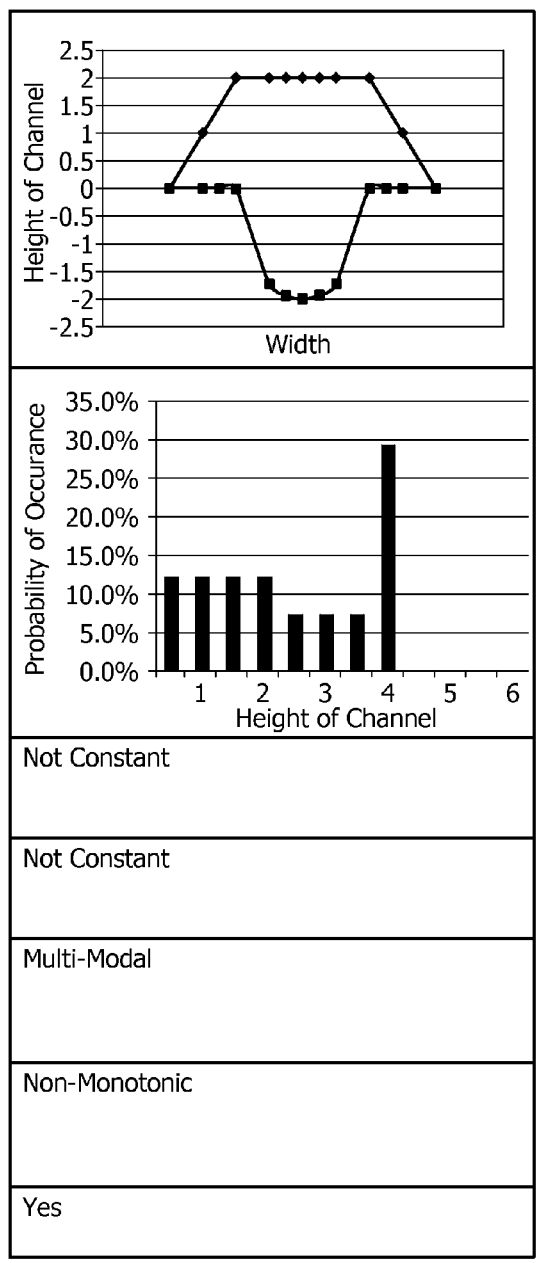
FIG. 3 con'd

MICROCHANNEL TECHNOLOGY HAVING STRUCTURES WITH REDUCED MATERIAL AND ENHANCED VOLUMETRIC PRODUCTIVITY

INTRODUCTION

Microchannel apparatus for chemical processing provides significant advantages over conventional chemical processing technology including improved heat and mass transfer. Due to these advantages, microchannel processing and microchannel apparatus have been a topic of intense interest for many years. A major problem is that the cost of microchannel apparatus continues to hinder the use of microchannel processing. Cost is a particularly important for high temperature applications in which devices are often made of expensive materials such as the superalloys.

The present invention provides microchannel apparatus and methods of conducting processes in microchannel apparatus that require less material than in comparable conventional microchannel apparatus. The present invention also provides apparatus and methods that exhibit higher volumetric productivities; that is, greater production per device volume (which includes channel volume plus the volume of material that forms the apparatus.

SUMMARY OF THE INVENTION

The invention provides a more economical device that can use less material and provides a higher ratio of channel volume to device volume. The invention is particularly advantageous for applications in which there is a large pressure differential between adjacent microchannels.

This invention enables reducing the thickness of the load wall that separates two fluids of dissimilar pressure across part of, but not all of, the channel width. The strategic reduction of thickness in the load wall enables the integration of channel wall features or an increase in open channel area for pressure drop reduction or other advantages. The channel wall features may include features to retain one or more catalysts, impart non-laminar flow patterns, enhance mass transfer, mix fluid streams, enhance phase change, or enhance heat transfer. The inclusion of these non flat wall features through the use of this invention is an important advantage to avoid additional thickness of the channel walls in the channel repeating unit. As an example, in an embodiment without the novel invention, a load wall thickness may be 1 mm and the thickness of wall features may be 0.25 mm for a sum total of 1.25 mm of wall plus feature thickness between two fluid channels. In the novel invention, the thickness of the wall features (0.25 mm) is embedded within the load wall thickness by offsetting the features from the side channel or ribs by a minimum of 9%. In this embodiment, the total wall thickness between two fluids remains at 1 mm while the innovative channel also includes the added functionality rising from the 0.25 mm deep wall features.

In a first aspect, the invention provides a laminated microchannel apparatus comprising: a first layer comprising a plurality of first microchannels; and a second layer comprising a plurality of second microchannels. The first layer is adjacent to the second layer; and the plurality of first microchannels are adjacent to and parallel with the plurality of second microchannels. At least one of the first microchannels is aligned with a second microchannel to form a microchannel pair; wherein each microchannel in a microchannel pair is aligned such that a straight line can be drawn through the structural material on at least one side of the microchannels in a direction that is perpendicular to the microchannel length; this does not mean that the first and second microchannels necessarily have equal width, nor does it mean that the edges are necessarily precisely aligned. Preferably, the straight line is in the height direction so that there is a vertical support beam of solid structural material. The height direction is the direction in which the laminates are stacked. Each of the first microchannels and the second microchannels have parallel lengths that run in same direction, and each microchannel has one microchannel edge at each end along the width direction. The width direction is in a plane parallel to the laminae. The first microchannel and the second microchannel in each microchannel pair are separated by a microchannel wall; wherein the microchannel wall is defined to be coextensive with the second microchannel such that the width of the microchannel wall in each microchannel pair is defined as having same the width as the second microchannel (in other words, the width of the microchannel wall is the same as the width of the second microchannel, and they have the same beginning and ending positions in the width direction). The central region of the microchannel wall has an average thickness that is less than the average thickness of the edges of the microchannel wall; and, if the first and second microchannels are pressurized to different pressures, the maximum bending stress in the central region of the microchannel wall is between 50% and 100% of the maximum bending stress at the edges of the microchannel wall. Furthermore, the apparatus possesses one or more of the following characteristics: the central region of the microchannel wall is indented on both major surfaces; the thickness of the microchannel wall at all points in the central 20% of the wall's width is greater than at other points in the central region of the microchannel wall; and in a portion of the wall where the central region of the microchannel wall is thinner than the edge of the microchannel wall, one or both of the microchannels in the microchannel pair have constant cross sections for a length of at least 2 cm (for example, there are no surface features or capillary features in this portion). Cross-sections are measured perpendicular to length; which is the direction of flow in an operating device.

In another aspect, the invention comprises a laminated microchannel apparatus comprising: a first layer comprising a plurality of first microchannels; and a second layer comprising a plurality of second microchannels. The first layer is adjacent to the second layer. The plurality of first microchannels are adjacent to and parallel with the plurality of second microchannels. At least one of the first microchannels is aligned with a second microchannel to form a microchannel pair; wherein each microchannel in a microchannel pair is aligned such that a straight line can be drawn through the structural material on at least one side, in a direction that is perpendicular to the microchannel length; this does not mean that the first and second microchannels have equal width, nor does it mean that the edges are precisely aligned. Preferably, the straight line is in the height direction so that there is a vertical support beam of solid structural material. The first microchannels and the second microchannels have parallel lengths that run in same direction; wherein each microchannel has one microchannel edge at each end along the width direction. The second microchannels each have a height at all points on the microchannel edges that is at least 20% less than a height at a point in the central region (middle 80% of the channel width) of the second microchannel. Additionally, the first derivative of the height (expressed as a function of the width) of each of the second microchannels along their width is not constant, that is, the first derivative changes at least once, and the second derivative of the height of the each of the second microchannels along the width is also not constant.

The second microchannels do not contain surface features and also do not contain capillary features. Since the first derivative changes, the cross-sectional view of each second microchannel is not a circle or semi-circle. Surface irregularities, such as burrs, are disregarded in measuring the shape of a channel.

In another aspect, the invention provides a laminated microchannel apparatus comprising: a first layer comprising a plurality of first microchannels; and a second layer comprising a plurality of second microchannels. The first layer is adjacent to the second layer, and the plurality of first microchannels are adjacent to and parallel with the plurality of second microchannels. At least one of the first microchannels is aligned with a second microchannel to form a microchannel pair; wherein each microchannel in a microchannel pair is aligned such that a straight line can be drawn through the structural material on at least one side of the microchannels in a direction that is perpendicular to the microchannel length. Each of the first microchannels and the second microchannels have parallel lengths that run in same direction; wherein each microchannel has one microchannel edge at each end along the width direction. The second microchannels each have a height at all points on the microchannel edges that is at least 20% less than a height at a point in the central region (middle 80% of the channel width) of the second microchannel; and the first derivative of the height (expressed as a function of the width) of each of the second microchannels along their width is not constant, i.e. changes at least once, and the second derivative of the height of the each of the second microchannels along the width is also not constant; and the probability distribution function (a function of the probability of occurrence of different heights in the given channel) of the height of each of the second microchannels (arranged in the order of increasing heights) is non-monotonic and has a multi-modal distribution with at least three distinct modes in the height distribution function (i.e. there are at least three unique heights in the channel).

In the inventive aspects described above, the term "comprising" means "including" and requires the presence of the specified features, but it does not exclude the presence of additional features. For example, the apparatus includes a microchannel pair having the specified features, but there may also be other types of microchannels within the apparatus that do not have the specified features—for example, the apparatus may contain some microchannels that are unpaired or some (but not all) pairs of microchannels that do not have the specified features. In some preferred embodiments, all pairs of microchannels in a device possess the claimed features. Unless specified otherwise, the various features described herein are measured in a cross-section that is perpendicular to length (i.e., in an operating device, a cross-sectional plane that is perpendicular to flow). In some preferred embodiments, the channels have a constant cross-sectional area along at least 50% of their length, in some embodiments along at least 90% of their length, and preferably, the constant cross-sectional area is continuous along the microchannel. As in the description of other features, the presence of nonstructural materials such as catalyst are disregarded in measuring the cross-section.

The laminated apparatus is comprised of a stack of layers. Each layer has dimensions of height, width, and length; and each of width and length are at least five times (typically at least 100 times) greater than height of each layer. Typically, a laminated device is formed by stacking sheets and bonding the sheets. Where the process of making an apparatus is unknown, the laminated nature of a device can be determined by microscopy of the device, for example by viewing a cross-section of the device.

The "microchannel edges" are defined relative to the width of each microchannel, with the "edges" being the 9% of distance on each end of a microchannel's width (or, in the case where the invention is defined partly of the thickness of a microchannel wall, on each end of the width of a microchannel wall). The central region is +/−40% from the center (i.e., the region between 10% and 90% of width); and in some preferred embodiments the central region can be defined as +/−25% from the center (i.e., the region between 25% and 75% of width); unless specified, the broader definition applies. A microchannel wall that is coextensive with a microchannel, by definition, has edges and a central region that correspond to the percent distances in the width direction. In some preferred embodiments, the height of the microchannel at the microchannel edges is at least 20% less (averaged over the edges) than the microchannel height in the central region (averaged over the central region). In some preferred embodiments, the height of the microchannel at the microchannel edges is at least 40% less (averaged over the edges) than the microchannel height in the central region (averaged over the central region).

In some preferred embodiments of the inventive apparatus, the second microchannels each have a height at all points on the microchannel edges that is at least 20% less than a height at a point in the middle 50% (±25% of width from the midpoint) of the channel width of the second microchannel.

In preferred embodiments, each of the first microchannels is aligned with the second microchannel in a microchannel pair such that each microchannel in a microchannel pair has the same position on the horizontal axis such that the structural material on at least one side (where side refers only to the side at each edge in the horizontal direction) forms a vertical pillar of support material. This does not mean that the first and second microchannels have equal width, nor does it mean that the edges are precisely aligned.

In some preferred embodiments, the probability distribution function (a function of the probability of occurrence of different heights in the given channel) of the height of each of the second microchannels (arranged in the order of increasing heights) is non-monotonic and has a multi-modal distribution with at least two distinct modes in the height distribution function (i.e. there are at least two unique heights in the channel). In some preferred embodiments, in the probability distribution function, the contribution of any one height mode does not exceed 95% of the total modes of heights within the channel. In typical embodiments the probability distribution function (a function of the probability of occurrence of different heights in the given channel) of the height of each of the second microchannels (arranged in the order of increasing heights) is non-monotonic and has a multi-modal distribution with at least two distinct modes in the height distribution function (i.e. there are at least two unique heights in the channel).

In some embodiments, the second microchannels do not contain surface features and also do not contain capillary features. In some other embodiments, the second microchannels comprise surface features.

In some preferred embodiments, there is a discontinuous change in the height of a second microchannel—this would be achieved, for example, by stacking plates having aligned slots (for the second microchannel) of different widths. In some preferred embodiments, the height of each of the second microchannels is less in the center (measured along width) than at other points of the microchannel. In some preferred embodiments, the height of each of the second microchannels is greater at the center than at either edge, but less in the center (measured along width) than at other points of the microchannel (for example, a channel having a W shape). A preferred W-shaped channel has a center height that is at least 5% more (in some embodiments at least 10% more) than a height of the channel at the channel edges, and has a height on either side of the center that is at least 10% more (preferably at least 25% more) than the height at the center of the channel.

In some embodiments, there is a catalyst or an adsorbent present in the first or second microchannels. In some preferred embodiments, the width of the microchannels is at least 3 times greater than height; in some embodiments, microchannel length is at least 5 cm.

In some preferred embodiments there are at least 10 alternating pairs stacked in the height direction and the structural material between pairs of aligned microchannels create a support beam; and, the support beam extends in a straight line over the combined height of the microchannels.

In some preferred embodiments, the cross-section of each of the second microchannels comprises at least 4 right angles; in some embodiments at least 6 right angles—1 right angle at each corner and 2 right angles where metal is reduced. As in other aspects of the invention, manufacturing defects are disregarded in determining a right angle so that small deviations are disregarded.

In another aspect, the invention provides a system comprising the apparatus described herein wherein a first fluid is present in the first microchannels at a first pressure and a second fluid is present in the second microchannels at a second pressure; wherein the first and second pressures are different. In some preferred embodiments, the difference in pressure is at least 0.01 MPa, in some embodiments at least 1,000,000 Pa, in some embodiments in the range of 0.01 MPa to 20 MPa, and in some embodiments, the apparatus can be characterized at a fixed differential of 2,500,000 Pa. In some preferred embodiments, the first fluid and the second fluid are both gases.

In a further aspect, the invention provides a method of operating a operating a differential pressure process in a microchannel apparatus, comprising: flowing a first fluid through a first microchannel at a first pressure; and flowing a second fluid through a second microchannel at a second pressure; wherein the first and second pressures are different. The microchannel apparatus can be any of the apparatuses described herein. A unit operation can be performed on either fluid as it passes through the first or second microchannel.

The invention also includes methods of making apparatus comprising a step of stacking sheets to form any of the apparatuses described herein. The invention further includes a prebonded (i.e., before sheets are bonded together to form the laminated device) structure. In some preferred embodiments, microchannels are formed by sections cut through a sheet (rather than partially etched into a sheet) since this can provide an advantage in device construction.

Advantages of the present invention include: reduction in materials needed for a microchannel device, higher capacity per device volume, increased heat and/or mass transfer per device volume, and increased volumetric productivity.

GLOSSARY

Structural features related to manifolding are as defined in U.S. Published Patent Application No. 20050087767, filed Oct. 27, 2003 and U.S. patent application Ser. No. 11/400, 056, filed Apr. 11, 2006. Surface features, structured walls, and general device construction can be as described in U.S. Published Patent Applications 20070256736 and 20070017633. All of these patent applications are incorporated herein by reference as if reproduced in full below. In cases where the definitions set forth here are in conflict with definitions in the patent applications referred to above, then the definitions set forth here are controlling.

As is standard patent terminology, "comprising" means "including" and neither of these terms exclude the presence of additional or plural components. For example, where a device comprises a lamina, a sheet, etc., it should be understood that the inventive device may include multiple laminae, sheets, etc. In alternative embodiments, the term "comprising" can be replaced by the more restrictive phrases "consisting essentially of" or "consisting of."

"Adjacent to" means that the microchannels are separated by a microchannel wall; the first and second microchannels are separated by a load bearing wall. Each microchannel in a pair can have the same width where both sides align, or can have different widths where only one side is aligned, or the same or different widths where neither side is aligned provided that there is a vertical (i.e., in the height direction) beam of support material that extends over both the first and second microchannels in the height direction.

The bending stress, $S_b$, of a material can be calculated by equations known to those skilled in the art. For the rectangular geometry shown in FIG. 12, the bending stress can be calculated with the following equation:

$$S_b = \frac{W}{12}(6Lx - L^2 - 6x^2)(6/t^2) = \frac{W}{2}(6Lx - L^2 - 6x^2)(1/t^2)$$

which is further explained and exemplified in the examples section. For complex geometries, other calculation methods, including finite-element analysis, may be applied. In this invention, the bending stress is calculated for points along the microchannel wall.

"Capillary features" are features associated with a microchannel that are used to hold liquid substances. They are either recessed within a wall of a microchannel or protrude from a wall of the microchannel into the flow path that is adjacent to the microchannel wall. The features create a spacing that is less than 2 mm, more preferably 1 mm or less, still more preferably a spacing of 500 μm or less. The features have at least one dimension that is smaller than any dimension of the microchannel in which they are situated. The capillary features may be at any angle for a slot type structure or an array of holes or any other recessed or protruded structure used to retain a liquid by capillary forces.

"Connecting channels" are channels connected to a manifold. Typically, unit operations occur in connecting channels. Connecting channels have an entrance cross-sectional plane and an exit cross-sectional plane. Although some unit operations or portions of unit operations may occur in a manifold, in preferred embodiments, greater than 70% (in some embodiments at least 95%) of a unit operation occurs in connecting channels. A "connecting channel matrix" is a group of adjacent, substantially parallel connecting channels. In preferred embodiments, the connecting channel walls are straight. In some preferred embodiments, connecting channels are straight with substantially no variation in direction or width. The connecting channel pressure drop for a system of multiple connecting channels is the arithmetic mean of each individual connecting channel pressure drop. That is, the sum of the pressure drops through each channel divided by the number of channels. "Connecting microchannels" have a minimum dimension of 2 mm or less, more preferably 0.5 to 1.5 mm, still more preferably 0.7 to 1.2 mm, and a length of at least 1 cm.

Channels are defined by channel walls that may be continuous or may contain gaps. Interconnecting pathways through a foam or felt are not connecting channels and are not microchannels (although a foam, etc. may be disposed within a channel).

A "header" is a manifold arranged to deliver fluid to connecting channels.

A "height" is a direction perpendicular to length and width. In a laminated device, height is the stacking direction. Length and width are in the plane of the layers. For purposes of the present invention, microchannel height is the distance in the height direction that is not occupied by structural material.

A "laminated device" is a device made from laminae that is capable of performing at least one unit operation on a process stream that flows through the device.

A "length" refers to the distance in the direction of a channel's (or manifold's) axis, which is in the direction of flow.

A "manifold" is a volume that distributes flow to two or more connecting channels. The entrance, or inlet, surface of a header manifold is defined as the surface in which marks a significant difference in header manifold geometry from the upstream channel. The exit, or outlet, surface of the footer manifold is defined as the surface which marks a significant difference in the footer manifold channel from the downstream channel. For rectangular channels and most other typical manifold geometries, the surface will be a plane; however, in some special cases such as hemicircles at the interface between the manifold and connecting channels it will be a curved surface.

A "microchannel" is a channel having at least one internal dimension (wall-to-wall, not counting catalyst) of 10 mm or less (preferably 2.0 mm or less) and greater than 1 μm (preferably greater than 10 μm), and in some embodiments 50 to 500 μm; a microchannel remains within these dimensions for a length of at least 1 cm, preferably at least 20 cm. Microchannels are also defined by the presence of at least one inlet that is distinct from at least one outlet. Microchannels are not merely channels through zeolites or mesoporous materials. The length of a microchannel corresponds to the direction of flow through the microchannel. Microchannel height and width are substantially perpendicular to the direction of flow of through the channel. The value of the Reynolds number describes the flow regime of the stream. While the dependence of the regime on Reynolds number is a function of fluid velocity, fluid properties, and channel cross-section shape and size, the following ranges are typically used for channels:
Laminar: Re<2000 to 2200
Transition: 2000-2200<Re<4000 to 5000
Turbulent: Re>4000 to 5000.

A "bulk flow path" refers an open channel within microchannel apparatus that allows rapid gas flow through the reaction chamber without large pressure drops. Bulk flow paths preferably have a cross-sectional area of $5 \cdot 10^{-8}$ to $1 \cdot 10^{-2}$ m$^2$, more preferably $5 \cdot 10^{-7}$ to $1 \cdot 10^{-4}$ m$^2$.

A "structured wall" refers to a wall that is made up of plural layers in which each of the plural layers have overlapping apertures. The apertures in a layer comprise an open area of at least 0.01 square micrometers (μm$^2$), preferably 0.01 to 100,000 square micrometers (μm$^2$), more preferably 5 to 10,000 square micrometers (μm$^2$); and for a structured wall, each layer must contain at least 10 such apertures, more preferably at least 1000, although there may be intervening layers with less than 10 very large apertures. The apertures should assist in mixing without creating a large dispersion in residence time. A structured wall is on the side of a bulk flow path. Some examples of structured walls are illustrated by Tonkovich et al. in U.S. Published Patent Application Nos. 2007/0256736 and 20060120213, which are incorporated herein by reference.

"Structural material" is the material that supports the structure of the device. By definition, "structural material" does not include the material that makes up a surface feature (or a capillary feature)—thus projections from a surface would not count as "structural material" and would not count for measuring height. As an example, if a cross-section of a microchannel had an open channel height (the height of a bulk flow path) of 0.5 mm and a surface feature height of 0.4 mm, then the microchannel height would be 0.9 mm. Also, for purposes of defining the invention, burrs or other small surface irregularites (which typically account for 2% or less of a channel's height) are disregarded.

A "surface feature" is a projection from, or a recess into, a microchannel wall that modifies flow within the microchannel. The features increase surface area and create convective flow that brings fluids to a microchannel wall through advection rather than diffusion. In surface features or capillary features of the present invention, the spacing between recesses or projections is in the range of 0.05 mm to 10 mm. Surface features and capillary features are described in detail in Tonkovich et al. US Published Patent Application US 2007/0017633A1 which is incorporated herein by reference as if reproduced in full below. In the present invention, the surface features or capillary features are not counted in determining the thickness of a load bearing microchannel wall; so in the case of recesses, the thickness is measured from the bottom of a recess.

"Unit operation" means chemical reaction, vaporization, compression, chemical separation, distillation, vaporization, condensation, mixing, heating, or cooling. A "unit operation" does not mean merely fluid transport, although transport frequently occurs along with unit operations. In some preferred embodiments, a unit operation is not merely mixing.

DETAILED DESCRIPTION OF THE INVENTION

The high heat and mass transfer coefficient associated with microchannel technology is a result of small channel dimensions. Due to the small dimensions, the flow in microchannels is typically in the laminar flow regime (Re<2000) which is associated with low Nusselt number compared to Nusselt number in turbulent flow regime. Flow within the inventive apparatus is typically laminar; however, for some embodiments, flow within the inventive apparatus may be in the transition or turbulent regime. In other embodiments, some multiple flow regimes may occur within a single fluid channel at different locations or within different fluids within a common device. Commonly the heat and mass transfer rate in microchannels is enhanced by passively disrupting the laminar boundary layer using surface features.

Multiple parallel microchannels may be used in a device to process fluids, with scale-up to higher capacities achieved by designing the devices with more parallel microchannels. The parallel microchannels may be arranged in arrays, with multiple rows of parallel microchannels. The microchannel devices may process multiple streams, with are separately manifolded and distributed to multiple arrays of microchannels. The microchannels processing a first fluid stream may be interleaved with a second set of microchannels processing a second fluid stream. There can be more than two arrays per microchannel device (etc.)

Figure 1:
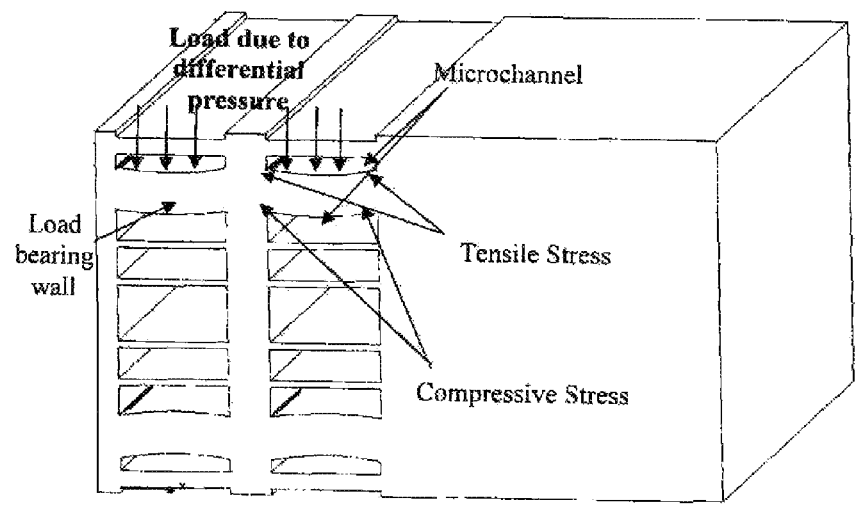
FIG. 1 is a schematic drawing showing stresses in a microchannel device operating with a pressure differential between adjacent channels separated by a wall.

In a microchannel device, separate fluid streams may be operating at different temperatures and pressures, creating a differential pressure across a wall, etc. For most microchannel devices with 2 or more microchannels, fluid streams are separated by a load bearing wall, the thickness of which is defined by the operating temperature and differential pressure between the streams. FIG. 1 presents a schematic drawing of stresses in a typical microchannel device. We found that by utilizing the low stress regions on the load bearing wall and placing surface features in these regions, the overall volume of the microchannel device can be reduced significantly. A microchannel heat exchanger design was investigated and it was found that utilizing the inventive design reduced the overall volume of the heat exchanger by 25% while maintaining the same prodcutivity.

Bending produces stresses in a direction normal to the load application. For fixed supports, the highest tensile stress is at the supported edge, on the same side as the applied load, and the highest compressive stress is at the supported edge, on the opposite side to the applied load.

The bending moment across the channel width is calculated as:

$$M = \frac{W}{12}(6Lx - L^2 - 6x^2)$$

Figure 2:
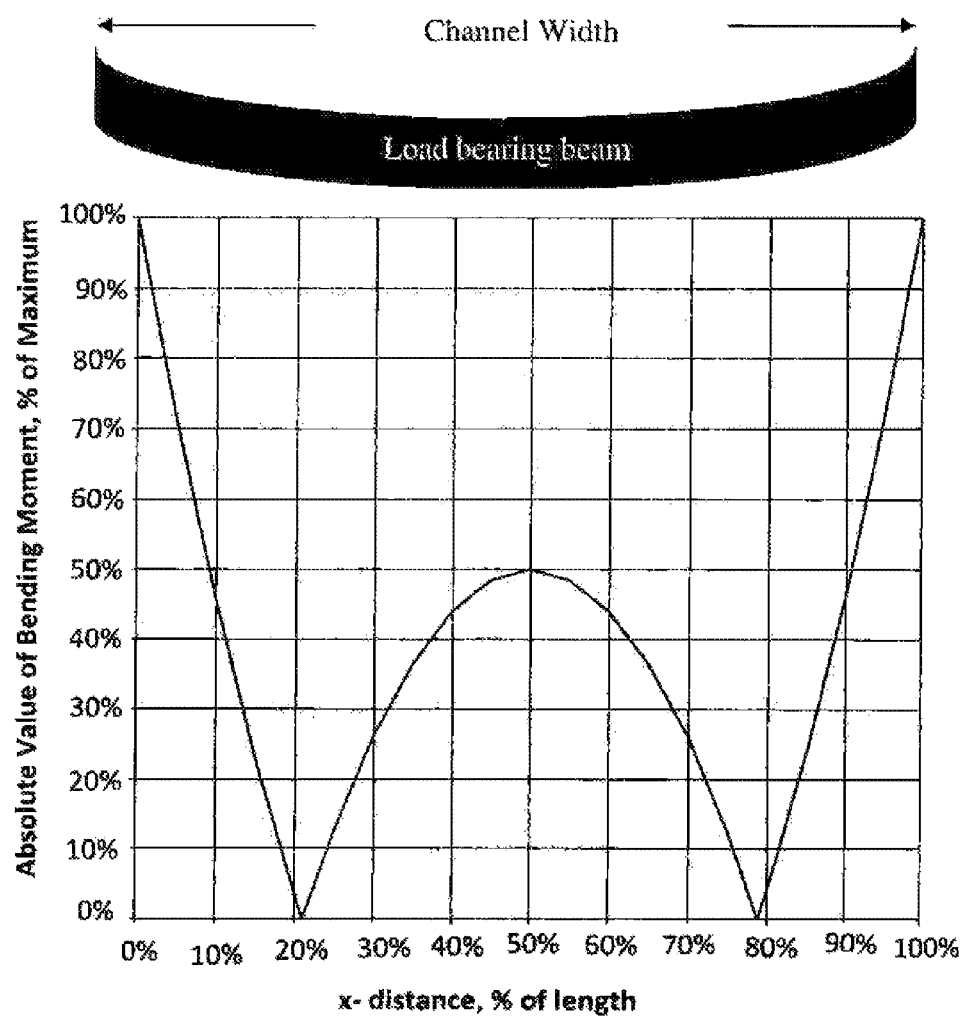
FIG. 2 shows the variation of absolute bending moment along the channel width.

Where,
M=Bending moment, N-m
W=Force per unit length, N/m
L=Overall width of the channel, m
x=Distance from supported edge, m As shown in FIG. 2, the stress on the load bearing wall is not uniform across the width for uniform pressure loading, it gives opportunities to use different channel heights across the channel width. If surface features are used, then the depth of surface features may be varied across the channel width. The depth of surface features can be used to control the mixing and pressure drop through the channel.

As shown in FIG. 2, for a load applied to the floor of a channel with rectangular cross section, the maximum absolute value of the bending moment is at the supported edges of the load bearing wall, decreases to zero part of the way in from the edges, and is 50% of maximum at the center. The variation in the bending moment across the width suggests that the need for thick supporting material in the microchannel wall if greatest at the edge of the microchannel, and the thickness of supporting material can be reduced according to matching load requirements in the central region. At about 10% of total width distance away from the edges, only 50% of the wall thickness is needed compared to the wall thickness requirement at the edges. The width span between 10% of the width to 90% of the width can have a greater channel height than at the channel edges. This additional volume in the center of the channel can be used to increase the reaction volume available to carry out chemical processes and can further be used to place surface features (advantageously with a depth of 50% or less of the thickness of wall at the edges) and enhance the heat and mass transfer. Selectively increasing the operating volume at the channel center but not in the edge region (the 9% of width on one channel edge and the 9% of width on the other edge) reduces the overall metal to volume ratio of the device significantly compared to a design that uses constant load bearing wall thickness (thickness same as needed at the edges) while improving the heat and mass transfer.

Conventionally, simple reactor cross-sections have been used to form the process/heat exchange channels. The thickness of walls between these channels is determined based on the various material allowances such as stress, and cyclic life considerations. By incorporating this novel reduced metal concept, one can design microchannel devices with non-uniform wall thicknesses between the channels that not-only provides a larger flow channel but also reduces the overall metal consumption per channel and in the device.

The reduced metal cross-section can be described mathematically by first, characterizing the height of the microchannel as a function of the channel width and secondly, by analyzing the probability (of occurrence) distribution function of the various heights in the given channel cross section (arranged in the order of increasing channel heights). The application of the reduced metal concept allows the creation of new channel cross-sections where the first derivative (slope) of the height of the microchannel with respect to the width is not constant and the second derivative (curvature) of the height of the microchannel with respect to the width is also not constant. Additionally, implementing the reduced metal concept, the probability distribution function of the channel height distribution can also be multi-modal and non-monotonic. Each mode of the probability distribution function corresponds to a distinct local maximum in the curve representing the probability of the occurrence of a given channel height in the cross-section. A multi-modal function has two or more 'modes'. A monotonic function is a function whose successive values are increasing, decreasing or constant. Thus, for a probability distribution function of the channel heights in the given cross section to be non-monotonic, the probability of the occurrence of the channel heights, when arranged in the order of increasing channel heights should not be continually increasing, decreasing or constant.

Figure 3:
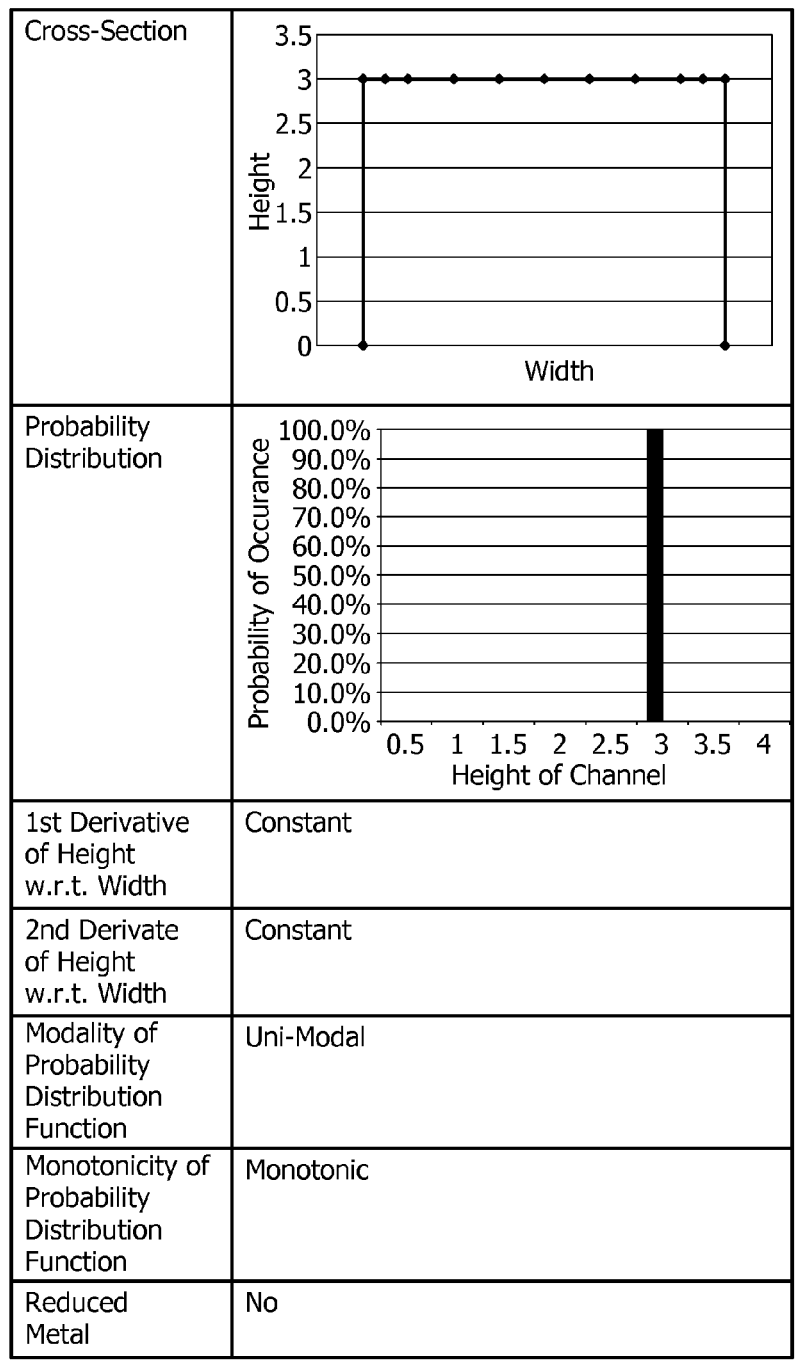
FIG. 3 illustrates a variety of types of cross-sectional views of microchannels and characteristics of their shapes.

Selected new microchannel cross sections enabled by this reduced metal concept and the criteria for determination of the "reduced metal application" for a few representative channel cross-sections (without and with reduced metal concepts) are illustrated in FIG. 3.

This invention, may be used to optimize the design of surface features in microchannel devices. A "surface feature" is a projection from, or a recess into, a microchannel wall that modify flow within the microchannel. The surface features have a depth, a width, and a length for non-circular surface features. In either case, the presence of surface features is ignored in determining the height of a microchannel—this is because the surface features are not considered to contribute to wall strength. Surface features (viewed from an overhead perspective) may include circles, oblong shapes, squares, rectangles (typically angled with respect to flow), checks, chevrons, zig-zags, and the like, projecting into a bulk flow channel. The features increase surface area and create convective flow that brings fluids to a microchannel wall through advection rather than diffusion. Flow patterns may swirl, rotate, tumble and have other regular, irregular and or chaotic patterns—although the flow pattern is not required to be chaotic and in some cases may appear quite regular. The flow patterns are stable with time, although they may also undergo secondary transient rotations. The surface features are preferably at oblique angles—neither parallel nor perpendicular to the direction of flow past a surface. Surface features may be orthogonal, that is at a 90 degree angle, to the direction of flow, but are preferably angled. The active surface features are further preferably defined by more than one angle along the width of the microchannel at least at one axial location. The two or more sides of the surface features may be physically connected or disconnected. The one or more angles along the width of the microchannel act to preferentially push and pull the fluid out of the straight laminar streamlines. Preferred ranges for surface feature depth are less than 2 mm, more preferably less than 1 mm, and in some embodiments from 0.01 mm to 0.5 mm. A preferred range for the lateral width of the surface feature is sufficient to nearly span the microchannel width (as shown in the herringbone designs), but in some embodiments (such as the fill features) can span 60% or less, and in some embodiments 40% or less, and in some embodiments, about 10% to about 50% of the microchannel width. In preferred embodiments, at least one angle of the surface feature pattern is oriented at an angle of 10°, preferably 30°, or more with respect to microchannel width (90° is parallel to length direction and 0° is parallel to width direction). Lateral width is measured in the same direction as microchannel width. The lateral width of the surface feature is preferably 0.05 mm to 100 cm, in some embodiments in the range of 0.5 mm to 5 cm, and in some embodiments 1 to 2 cm. In some preferred embodiments, surface features comprise at least 3 identical features in series. Some examples of surface features are illustrated by Tonkovich et al. in U.S. Published Patent Application No. 20070017633, which is incorporated herein by reference as if reproduced in full below.

The depth of surface features can be used to control the mixing and pressure drop through the channel. Deeper surface features are needed for mixing flow in a high velocity stream. Also, the new load bearing wall design allows use of multiple surface feature designs in a single microchannel.

The depth of features embedded in the load bearing wall may range from shallow (5 to 50 microns), mid range (50 to 250 microns), or deep features (greater than 250 microns). The features may have a single depth, or may have a variable depth (either discrete multiple depths or gradually changing depths) along the width and/or length of a microchannel. The features when offset from the corner of the channel may be created within the load bearing wall without a loss of mechanical strength or integrity. For shallow features, up to 50 microns, an offset of 3% or more per side of a channel width would allow the inclusion of any shallow feature on a wall thickness of 0.5 mm or greater. For the same shallow features, an offset of 10% would allow the inclusion of any shallow feature on a wall thickness of 0.25 mm or greater. Mid range features (up to 250 microns in average depth), could be accommodated within the center part of the shim or wall of a minimum thickness of 0.5 mm if they are offset roughly 10% from each corner.

In one embodiment, the depth of features varies along the width of the channel and the total amount of offset from the corner of a shim may be reduced. The variation in reduction in depth should always be less than or equal to the absolute value of the % of maximum thickness as shown in FIG. 2. For example, a maximum of 50% of the metal thickness needed at the corner is needed roughly 9% of the channel span or width away from the edge.

Flow may travel into and out of each feature or merely past the features such that molecules substantially diffuse within or around the indented features. Flow may travel through the features longitudinally, but at a reduced flow rate relative to the average flow in the main channel. The surface features may be used to retain a catalyst, to induce disrupted flow in the microchannel, to trip the flow pattern from laminar to transition flow at a Reynolds number less than a classical value of 2200 (in some embodiments at 2000 or less), to create a mass transfer agent such as an adsorbent, distillation structure, absorption structure, or a phase rejection or collection structure, a phase change structure, or a combination of these. The surface features may be used to assist with the initiation or stabilization of boiling or combustion. The surface features may be used to collect solid particles or biological agents.

Figure 4:
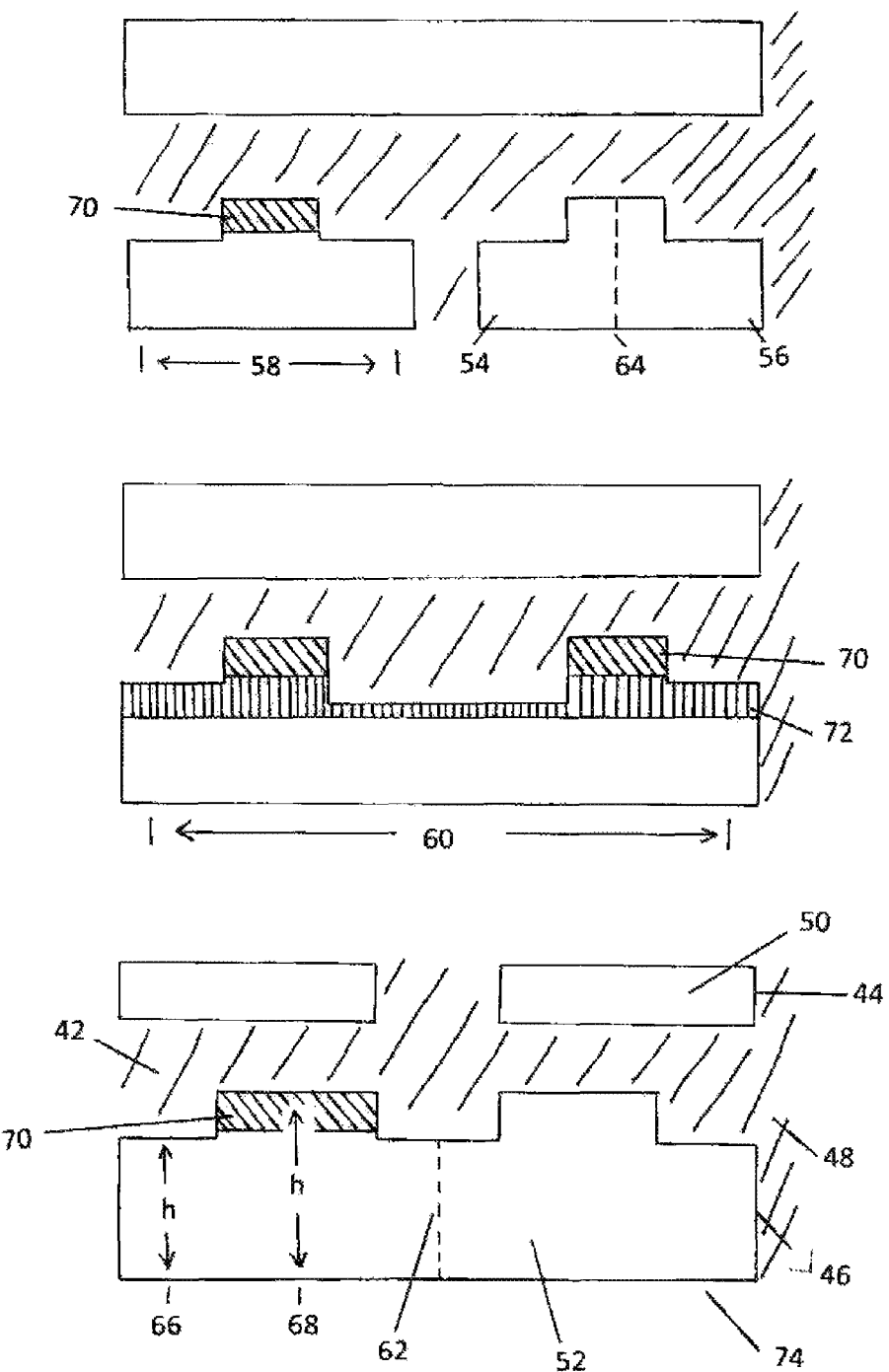
FIG. 4 illustrates cross-sectional views of microchannels that have designs to reduce materials while maintaining strength.

FIG. 4 shows cross section views of 3 examples of sets of parallel microchannels that are designed to provide additional microchannel volume without reducing strength for operation at different interchannel pressures. The shaded region 42 is the structural material. The edges 44, 46 are aligned so that a support beam 48 is present that traverses the height of both microchannels 50, 52. Each microchannel has edges 54, 56 at the end 10% of width. The central 80% of width 58, 60 of a microchannel is termed the "middle" section, or middle of a microchannel. The "center" is the geometric central axis 62, 64 of a microchannel. The height 66, 68 of a microchannel is also shown. The height of an edge section is at least 20% (preferably at least 30%) less than the height 68 of at least one point in the middle of the microchannel. In some preferred embodiments, the center 62 of a microchannel has a height that is at least 5% (preferably at least 10%) less than the height 68 of at least one point in the middle of the microchannel.

In some preferred embodiments, there are surface features 70 in the microchannel. There may be more than one layer of surface features 70, 72. Preferably, the height of surface features is greater in the middle of a microchannel than at an edge. In some preferred embodiments, the height of surface features is greater in the middle of a microchannel than the center. The figure also illustrates a W-shaped microchannel 74.

Figure 5:
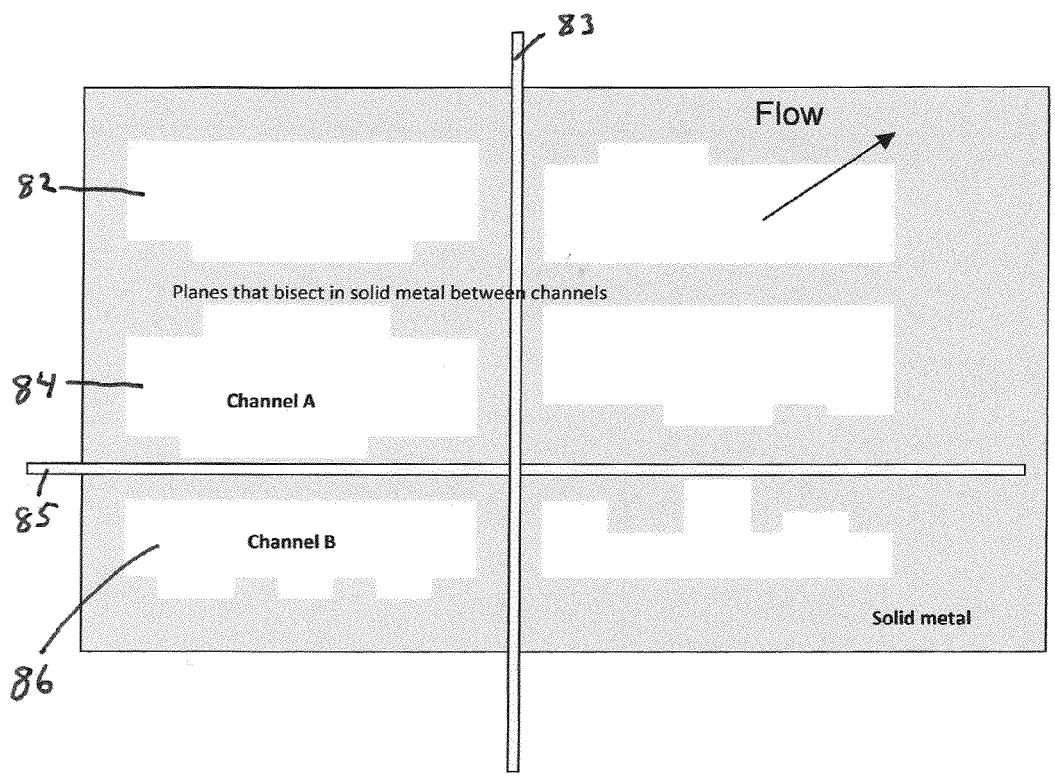
FIG. 5 illustrates vertical and horizontal support beams.

FIG. 5 illustrates a cross section view of a portion of microchannel apparatus with the inventive channels 82, 84 (channel A), 86 (channel B) shown on the left side of the figure. Microchannel pairs can be exemplified by either pair 82 and 84 or 84 and 86. In this design there is a vertical support beam (indicated by the vertical line 83) and a horizontal support beam (indicated by horizontal line 85). In some preferred embodiments of the invention, a vertical and/or horizontal support beam traverse an entire device.

Microchannel Apparatus—General Considerations

The inventive apparatus may have any of the features mentioned in the following descriptions. Microchannel reactors are characterized by the presence of at least one reaction channel having at least one dimension (wall-to-wall, not counting catalyst) of 1 cm or less, preferably 2 mm or less (in some embodiments about 1.0 mm or less) and greater than 1 µm, and in some embodiments 50 to 500 µm. A catalytic reaction channel is a channel containing a catalyst, where the catalyst may be heterogeneous or homogeneous. A homogeneous catalyst may be co-flowing with the reactants. Microchannel apparatus is similarly characterized, except that a catalyst-containing reaction channel is not required. The gap (or height) of a microchannel is preferably about 2 mm or less, and more preferably 1 mm or less. The length of a reaction channel is typically longer. Preferably, the length is greater than 1 cm, in some embodiments greater than 50 cm, in some embodiments greater than 20 cm, and in some embodiments in the range of 1 to 100 cm. The sides of a microchannel are defined by reaction channel walls. These walls are preferably made of a hard material such as a ceramic, an iron based alloy such as steel, or a Ni-, Co- or Fe-based superalloy such as monel. They also may be made from plastic, glass, or other metal such as copper, aluminum and the like. The walls may also be made from a composite material of two or more materials in thermal contact. The choice of material for the walls of the reaction channel may depend on the reaction for which the reactor is intended. In some embodiments, reaction chamber walls are comprised of a stainless steel or Inconel® which is durable and has good thermal conductivity. The alloys may be low in sulfur, and in some embodiments are subjected to a desulfurization treatment prior to formation of coatings on the material, such as an aluminide coating. Typically, reaction channel walls are formed of the material that provides the primary structural support for the microchannel apparatus. Microchannel apparatus can be made by known methods, and in some preferred embodiments are made by laminating interleaved plates (also known as "shims"), and preferably where shims designed for reaction channels are interleaved with shims designed for heat exchange. Some microchannel apparatus includes at least 10 layers laminated in a device, where each of these layers contain at least 10 channels; the device may contain other layers with less channels.

Microchannel apparatus (such as microchannel reactors) preferably include microchannels (such as a plurality of microchannel reaction channels) and a plurality of adjacent heat exchange microchannels. The plurality of microchannels may contain, for example, 2, 10, 100, 1000 or more channels capable of operating in parallel. In preferred embodiments, the microchannels are arranged in parallel arrays of planar microchannels, for example, at least 3 arrays of planar microchannels. In some preferred embodiments, multiple microchannel inlets are connected to a common header and/or multiple microchannel outlets are connected to a common footer. During operation, heat exchange microchannels (if present) contain flowing heating and/or cooling fluids. Non-limiting examples of this type of known reactor usable in the present invention include those of the microcomponent sheet architecture variety (for example, a laminate with microchannels) exemplified in U.S. Pat. Nos. 6,200,536 and 6,219,973 (both of which are incorporated by reference). Performance advantages in the use of this type of reactor architecture for the purposes of the present invention include their relatively large heat and mass transfer rates, and the substantial absence of any explosive limits. Pressure drops can be low, allowing high throughput. A heterogenous catalyst can be fixed within the channels eliminating the need for separation. Catalysts may be in the form of particulate solids, wall coatings, engineered structures, and combinations of these structures. In some embodiments, a reaction microchannel (or microchannels) contains a bulk flow path. The term "bulk flow path" refers to an open path (contiguous bulk flow region) within the reaction chamber. A contiguous bulk flow region allows rapid fluid flow through the reaction chamber without large pressure drops. Bulk flow regions within each reaction channel preferably have a cross-sectional area of $5\times10^{-8}$ to $1\times10^{-2}$ m$^2$, more preferably $5\times10^{-7}$ to $1\times10^{-4}$ m$^2$. The bulk flow regions preferably comprise at least 5%, more preferably at least 50% and in some embodiments, 30-99% of either 1) the interior volume of a microchannel, or 2) a cross-section of a microchannel.

In many preferred embodiments, the microchannel apparatus contains multiple microchannels, preferably groups of at least 5, more preferably at least 10, parallel channels that are connected in a common manifold that is integral to the device (not a subsequently-attached tube) where the common manifold includes a feature or features that tend to equalize flow through the channels connected to the manifold. Examples of such manifolds are described in U.S. patent application Ser. No. 10/695,400, filed Oct. 27, 2003 which is incorporated herein. In this context, "parallel" does not necessarily mean straight, rather that the channels conform to each other. In some preferred embodiments, a microchannel device includes at least three groups of parallel microchannels wherein the channel within each group is connected to a common manifold (for example, 4 groups of microchannels and 4 manifolds) and preferably where each common manifold includes a feature or features that tend to equalize flow through the channels connected to the manifold.

Heat exchange fluids may flow through heat transfer microchannels adjacent to process channels (such as reaction microchannels), and can be gases or liquids and may include steam, oil, or any other known heat exchange fluids—the system can be optimized to have a phase change in the heat exchanger. In some preferred embodiments, multiple heat exchange layers are interleaved with multiple reaction microchannels. For example, at least 10 heat exchangers interleaved with at least 10 reaction microchannels and preferably there are 10 layers of heat exchange microchannel arrays interfaced with at least 10 layers of reaction microchannels. In other preferred embodiments, the ratio of heat exchange microchannels or layers to reaction microchannels or layers may vary, with some being in the range of 0.1 to 1 and some being in the range of 1 to 10. Each of these layers may contain simple, straight channels or channels within a layer may have more complex geometries. In preferred embodiments, one or more interior walls of a heat exchange channel, or channels, has surface features.

A general methodology to build commercial scale microchannel devices is to form the microchannels in the shims by different methods such as etching, stamping etc. These techniques are known in the art. For example, shims may be stacked together and joined by different methods such as chemical bonding, brazing etc. After joining, the device may or may not require machining.

Device features can be made by stamping or cutting features through a sheet or sheets; and alternatively or in addition, partial etch or material removal from a sheet can be used to make device features; combinations of cutting and etching can also be used. In some partially etched applications, the depth of the channel is removed from a sheet leaving a wall that intervenes between flow channels, and preferably ribs that support the walls for the differential pressure at temperature and preferably create a high aspect ratio microchannel (width to gap ratio>2).

In some embodiments, the inventive apparatus (or method) includes a catalyst material. The catalyst may define at least a portion of at least one wall of a bulk flow path. In some preferred embodiments, the surface of the catalyst defines at least one wall of a bulk flow path through which passes a fluid stream. During a heterogeneous catalysis process, a reactant composition can flow through a microchannel, past and in contact with the catalyst.

In some embodiments, the width of each connecting microchannel is substantially constant along its length and each channel in a set of connecting channels have substantially constant widths; "substantially constant" meaning that flow is essentially unaffected by any variations in width. For these examples the width of the microchannel is maintained as substantially constant. The term "constant" is defined within the tolerances of the fabrication steps.

Microchannels (with or without surface features) can be coated with catalyst or other material such as sorbent. Catalysts can be applied onto the interior of a microchannel using techniques that are known in the art such as wash coating from a sol or colloidal suspension. Techniques such as CVD or electroless plating may also be utilized. In some embodiments, impregnation with aqueous salts is preferred. Typically this is followed by heat treatment and activation steps as are known in the art. Other coatings may include sol or slurry based solutions that contain a catalyst precursor and/or support. Coatings could also include reactive methods of application to the wall such as electroless plating or other surface fluid reactions.

The invention includes processes of conducting chemical reactions and other unit operations in the apparatus described herein. The invention also includes prebonded assemblies and laminated devices of the described structure and/or formed by the methods described herein. Laminated devices can be distinguished from nonlaminated devices by optical and electron microscopy or other known techniques. The invention also includes methods of conducting chemical processes (such as chemical reactions) in the devices described herein. In some embodiments, the methods include the steps of flowing a fluid through a manifold and conducting a unit operation in the connecting channels (if the manifold is a header, a fluid passes through the manifold before passing into the connecting channels; if the manifold is a footer then fluid flows in after passing through the connecting channels). In some preferred embodiments, the invention includes non-reactive unit operations, including heat exchange, mixing, chemical separations, or solid formation processes within the microchannels, phase change unit operations such as condensation and evaporation; such processes are generally termed chemical processes, which in its broadest meaning (in this application) includes heat exchange, but in preferred embodiments is not solely heat exchange but includes a unit operation other than heat exchange and/or mixing.

The invention also includes processes of conducting one or more unit operations in any of the apparatus or methods of the invention. Suitable operating conditions for conducting a unit operation can be identified through routine experimentation. Reactions of the present invention include: acetylation, addition reactions, alkylation, dealkylation, hydrodealkylation, reductive alkylation, amination, ammoxidation aromatization, arylation, autothermal reforming, carbonylation, decarbonylation, reductive carbonylation, carboxylation, reductive carboxylation, reductive coupling, condensation, cracking, hydrocracking, cyclization, cyclooligomerization, dehalogenation, dehydrogenation, oxydehydrogenation, dimerization, epoxidation, esterification, exchange, Fischer-Tropsch, halogenation, hydrohalogenation, homologation, hydration, dehydration, hydrogenation, dehydrogenation, hydrocarboxylation, hydroformylation, hydrogenolysis, hydrometallation, hydrosilation, hydrolysis, hydrotreating (including hydrodesulferization HDS/HDN), isomerization, methylation, demethylation, metathesis, nitration, oxidation, partial oxidation, polymerization, reduction, reformation, reverse water gas shift, Sabatier, sulfonation, telomerization, transesterification, trimerization, and water gas shift. For each of the reactions listed above, there are catalysts and conditions known to those skilled in the art; and the present invention includes apparatus and methods utilizing these catalysts. For example, the invention includes methods of amination through an amination catalyst and apparatus containing an amination catalyst. The invention can be thusly described for each of the reactions listed above, either individually (e.g., hydrogenolysis), or in groups (e.g., hydrohalogenation, hydrometallation and hydrosilation with hydrohalogenation, hydrometallation and hydrosilation catalyst, respectively). Suitable process conditions for each reaction, utilizing apparatus of the present invention and catalysts that can be identified through knowledge of the prior art and/or routine experimentation. The invention includes any one or any combination of the above-cited reactions. To cite one example, the invention provides a reactor design for a steam methane reforming reaction having one or more of the design features described herein.

Pressure drop through a microchannel or set of connecting microchannels is preferably less than 5000 psi (350 bar), more preferably less than 500 psi (35 bar) and in some embodiments is in the range of 0.1 to 200 psi (0.007 to 14 bar).

Example 1

Application of Novel Stress Bearing Wall for a Heat Exchanger Design

Figure 6:
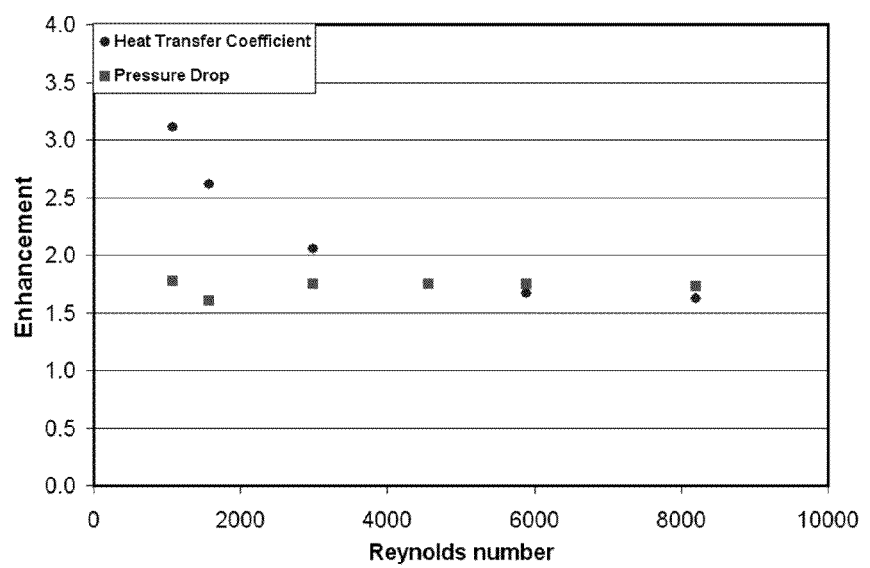
FIG. 6 shows heat transfer and pressure drop increase for a surface feature pattern as function of Reynolds number
Figure 7:
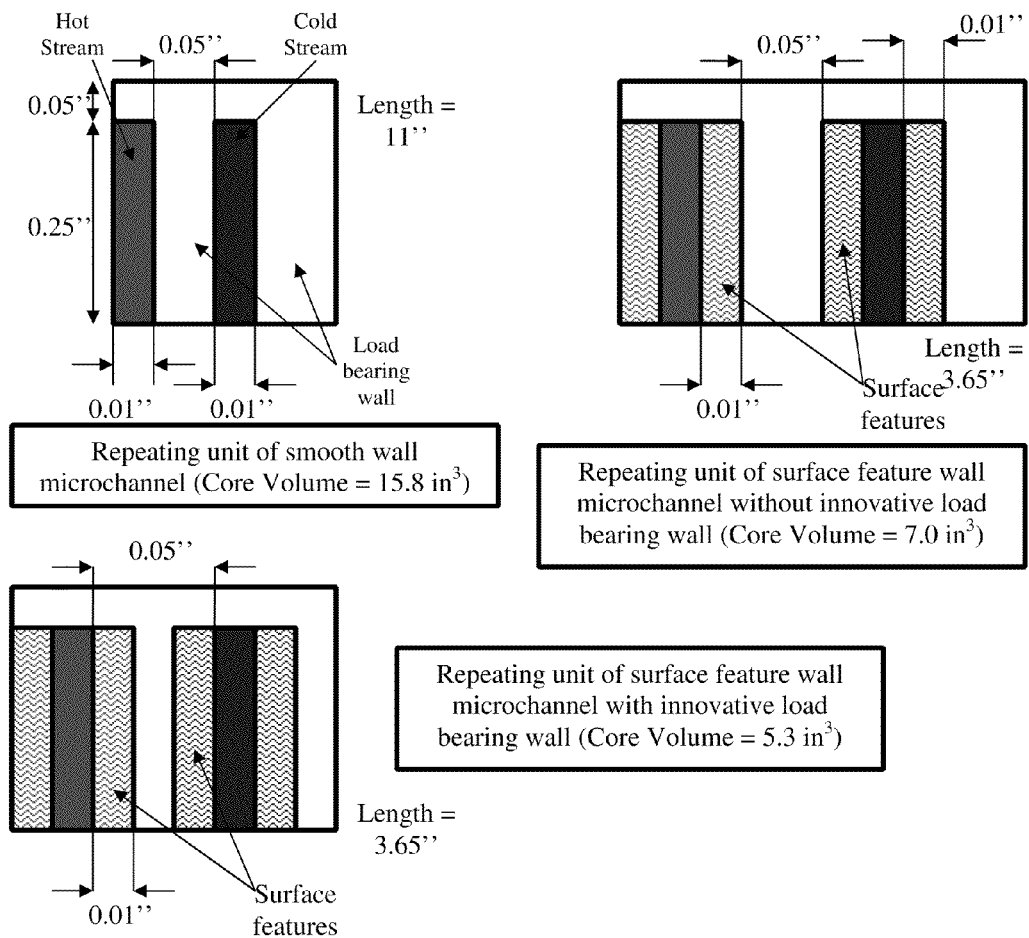
FIG. 7 shows a comparison of repeating unit cross-section for smooth channel and surface features walls (with and without the novel load bearing wall design)

FIG. 6 summarizes the enhancement in heat transfer coefficient by surface features and pressure drop as compared to a smooth wall. This data was acquired from testing using the device shown in FIG. 13 of US 2007/0017633.

Three microchannel heat exchanger core designs were designed and compared to evaluate the advantage of the present invention. The cases were:

Case 1: Microchannel heat exchanger core design with smooth channel walls
Case 2: Microchannel heat exchanger core design with surface feature but not utilizing the invented load bearing wall.
Case 3: Microchannel heat exchanger core design with surface feature utilizing the invented load bearing wall.

The heat exchanger core was a counter-current heat exchange between a process fluid and a coolant. The heat exchanger core quenched the process fluid from ~75° C. to 40° C. The physical properties of the process fluid used are listed below:

Specific heat of the process fluid: 4200 J/kg/K
Density of the process fluid: 1000 kg/m3
Viscosity of the process fluid=0.001 kg/m-s The process fluid was flowing at 5 liters per minute at 75° C. inlet temperature. The coolant used was water at 5° C. The operating pressure was near ambient pressure (~14.7 psig).

Figure 9:
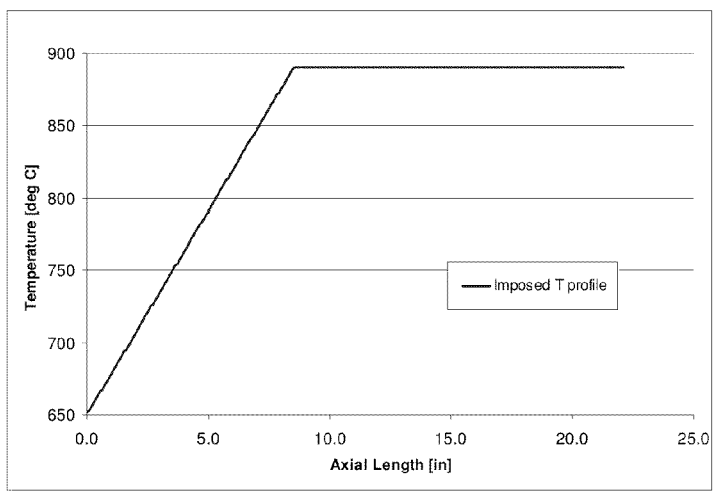
FIG. 9 shows the imposed temperature profile in an integrated steam methane reforming reactor to mimic the "combustion" channel for assessing the impact for the reduced metal wall.

FIG. 9 shows the cross-sectional repeating unit dimensions for the above listed cases. For all cases, the number of repeating units was 40. The maximum thickness of the load bearing wall was 0.050" while the depth of the surface feature was 0.01". The material of heat exchanger was stainless steel SS 304L.

Figure 8:
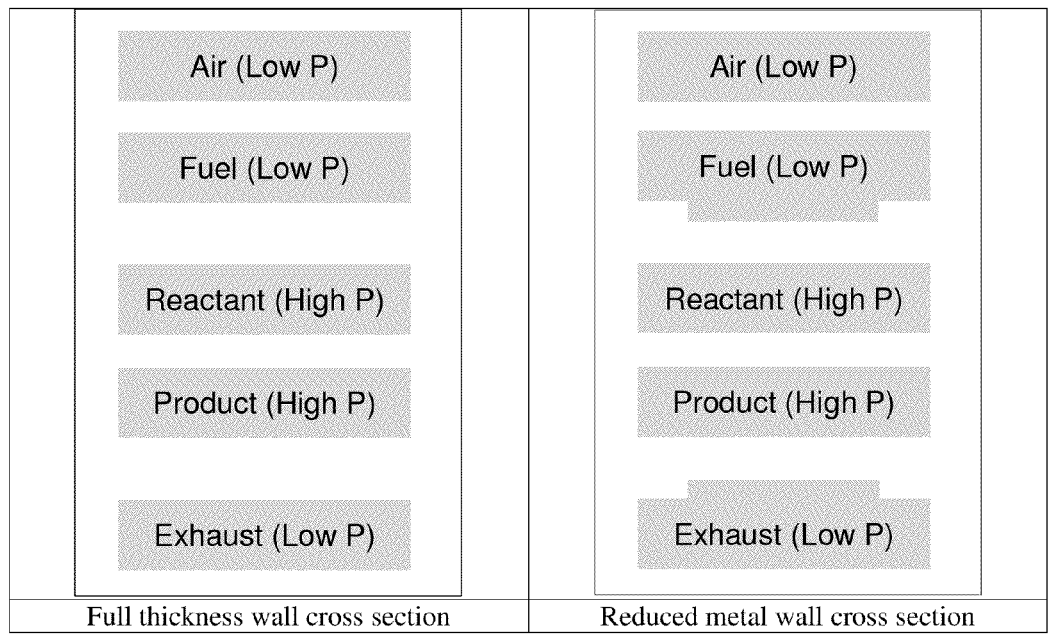
FIG. 8 schematically illustrates an integrated steam methane reforming reactor cross-section without and with the reduced metal concept application.

The heat transfer and pressure drop enhancement for Case 2 and Case 3 (with surface features) was used from FIG. 8. Table 2 compares the heat exchanger core volume and pressure for the three cases.

TABLE 2

Comparison of heat exchanger size with and without novel load bearing wall

| Heat Exchanger Type | Volume (in³) | Volumetric heat flux (W/cm³) | Pressure drop (psi) |
|---|---|---|---|
| Smooth wall | ~15.8 in³ | ~50 W/cm³ | 10.5 psi |
| Surface feature with uniform load bearing wall thickness | ~7.0 in³ | ~112 W/cm³ | 7.0 psi |
| Surface feature with novel load bearing wall | ~5.3 in³ | ~150 W/cm³ | 7.0 psi |

The novel load bearing wall reduced the heat exchanger core volume by 25%.

Example 2

Reduced Material Design in an Integrated Steam Reformer

One use of the reduced metal concept is envisioned in integrated stream methane reforming reactors. In this case, a low pressure combustion side is directly coupled with a high pressure steam reforming reaction. The bounding wall between these two zones is a thick wall that provides structural strength to the device. By applying the reduced metal concept one can thin down this wall to allow the use of less metal in fabricating the device which will reduce the cost. Additionally, the thin wall enhances the heat transfer between the combustion and reforming sections and allows higher productivity from the reactor box.

To illustrate this example, computational fluid dynamics (CFD) simulations are performed. A reactant channel with an inlet cross section of 0.102 cm (0.040")×0.406 cm (0.16") is modeled. At the end of the reactor, the reactant channel undergoes a u-turn and continues into a product channel with the same cross section of 0.102 cm (0.040")×0.406 cm (0.16"). The wall separating the reactant and product channels is 0.089 cm (0.035") thick. Both, the reactant and product channels are bound by a thick wall 0.203 cm (0.080") thick that separates the high pressure reforming side from the low pressure combustion side. The thickness of the wall is determined by a number of factors, including but not limited to pressure differential on either side of the wall, allowable stresses, working temperatures, etc. In the case of the integrated SMR reactor, a pressure differential of approximately 290 psi (2 MPa) exists across the 0.203 cm (0.080") thick wall that separates the high pressure reforming side from the low pressure combustion side. The combustion side is mimicked by imposing a temperature profile along the thick wall. Two different reactor lengths, 41.9 cm (16.5") and 54.6 cm (21.5") are investigated. The u-turn length is 0.254 cm (0.1") and a 1.27 cm (0.5") thick metal wall is simulated beyond the u-turn to mimic the shim perimeter. An external shim perimeter of 0.076 cm (0.03") is simulated on either side of the 0.406 cm (0.16") flow channels. In this case the thick wall contributes to ~50% of the metal volume.

The reduced metal option is implemented by leaving a full thickness wall of ~15% of the channel width i.e., 0.061 cm (0.024"), on either side of the 0.406 cm (0.16") wide inlet/exhaust channels. In the reduced metal section, the metal wall thickness is reduced to ~70% of the full thickness i.e., 0.142 cm (0.056"). This implementation of the reduced metal concept saves about ~10.5% of the metal volume used for both the cases illustrated below.

Figure 10:
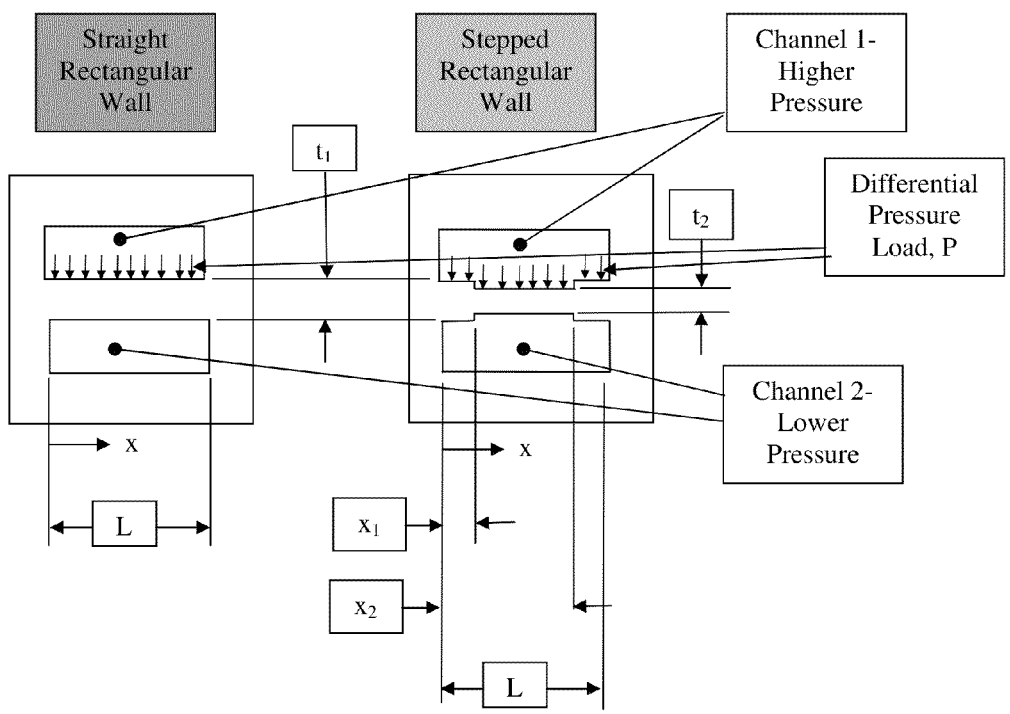
FIG. 10 illustrates designs that were used to calculate bending stress.
Figure 11:
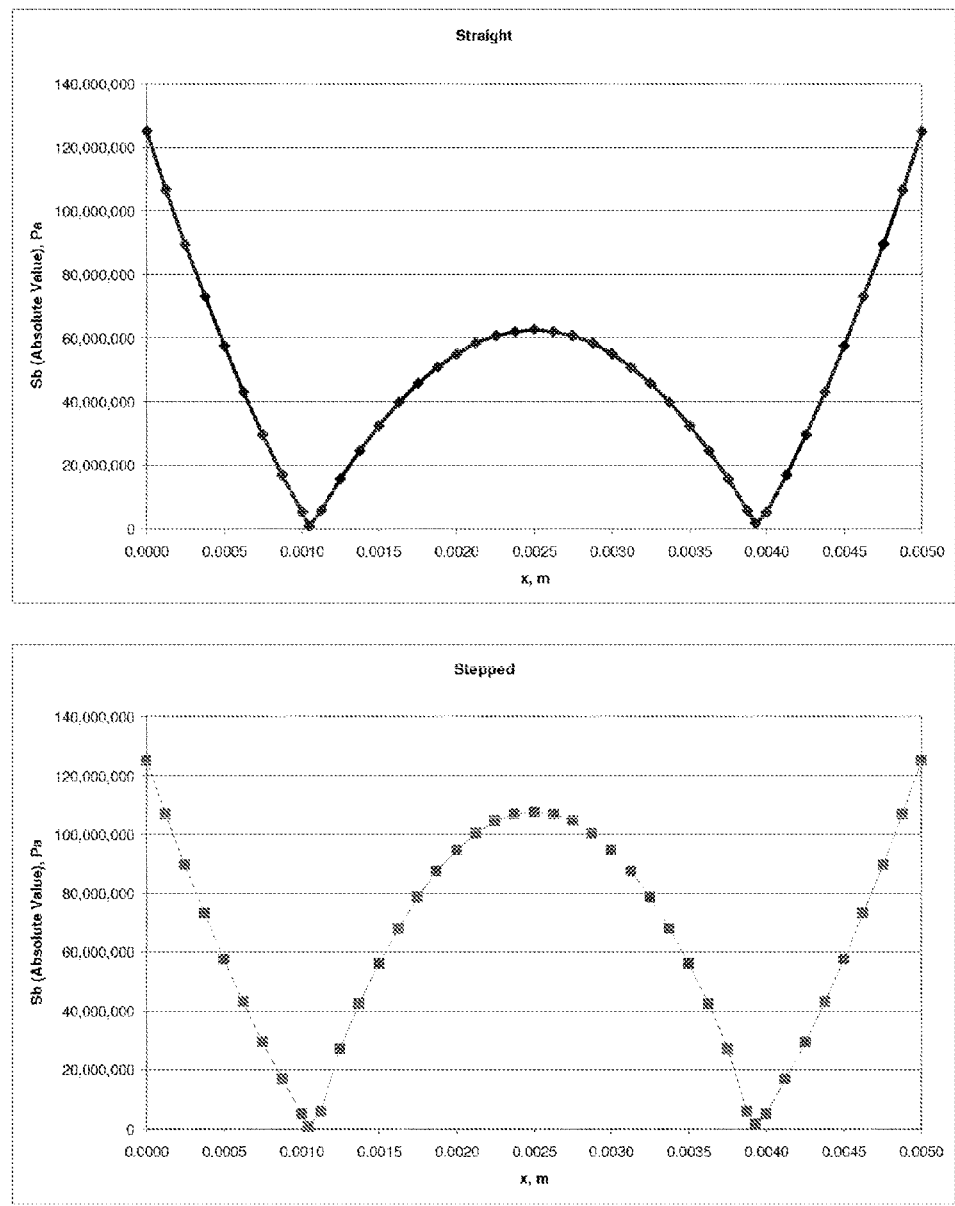
FIG. 11 shows bending stress for the designs shown in FIG. 10.
Figure 11:
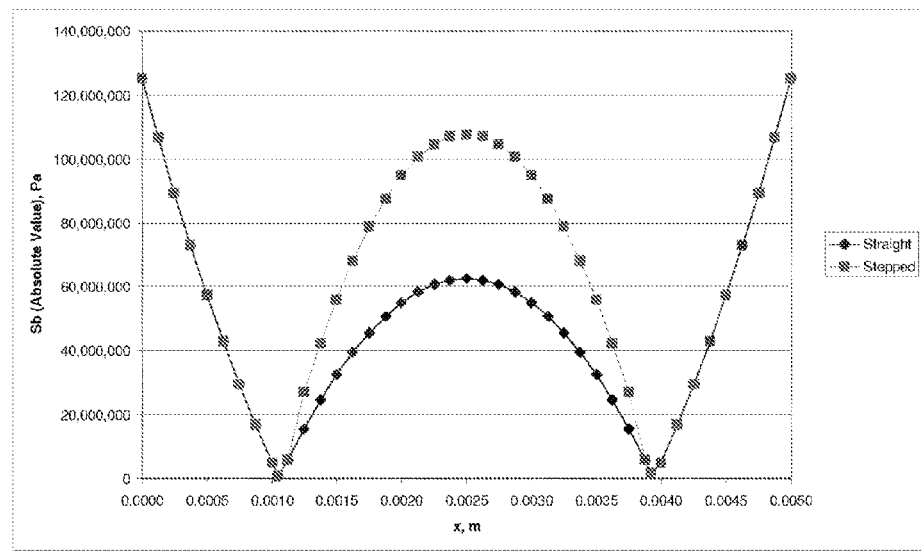

The schematic of the full thickness and the reduced thickness wall is shown in FIG. 10. The temperature profile is shown in FIG. 11.

The reactant channel inlet flow rate is $9.8334 \times 10^{-4}$ kg/s. The composition of the inlet stream is (10.9 mol % $CO_2$, 21.8 mol % $CH_4$, 58.8 mol % $H_2O$, 3.8 mol % $H_2$, 0.5 mol % CO and balance $N_2$). The reactant stream comes in at 650 deg C. and the reformer operates at a pressure of ~290 psig. The reforming catalyst ($Rh$—$Mg/Al_2O_3$) is applied on the walls of the entire reactant channel, the u-turn region and all but the initial 21.6 cm (8.5") of the product channel. The walls of the reactant and product channels may have one or multiple catalyst retaining features. The methane stream reforming ($CH_4 + H_2O \rightarrow 3H_2 + CO$) and water gas shift ($CO + H_2O \leftrightarrow H_2 + CO_2$) reactions occur in the reformer.

The temperature profile imposed to mimic the combustion side is summarized below. In practice, such a temperature profile can be achieved by a controlled combustion of a mixture of $H_2$, CO and $CH_4$.

CFD simulations were performed using the FLUENT® software and the results summarized below indicate that the creation of additional reaction volume affected by the reduction of the metal volume in the reactor structure (according to the present invention) leads to an enhanced performance:

| Case a: 41.9 cm (16.5") reactor length | | |
|---|---|---|
| Metric | Thick wall | Reduced metal wall |
| Metal volume (cm³) | 13.96 | 12.50 |
| $CH_4$ conversion | 64.0% | 65.5% |
| Heat transferred (W) | 1704 | 1744 |

| Case b: 54.6 cm (21.5") reactor length | | |
|---|---|---|
| Metric | Thick wall | Reduced metal wall |
| Metal volume (cm³) | 17.87 | 15.96 |
| $CH_4$ conversion | 74.9% | 76.1% |
| Heat transferred (W) | 1980 | 2017 |

The higher heat transferred to the reforming channels increases the $CH_4$ conversion for the reduced metal wall case. In this case, the novel load bearing wall reduced the reactor core (metal) volume by ~10.5%.

In example 2, for a pressure differential of ~290 psig, across the reaction section with a temperature profile illustrated in FIG. 11, a reduced metal volume reduction of ~10.5% is achieved. Also, for the heat exchanger in example 1, the application of the reduced metal concept resulted in ~25% reduction in the volume of the heat exchanger. Overall, this invention can be used to reduce the amount of metal required in microchannel devices conducting various unit operations (such as, heat exchange, reactions, mixing etc.) by at least 5%, or more preferably by at least 10% and even more preferably by at least 25% and in some cases by at least 50%.

Example 3

Calculated Example of Bending Stress

Bending stress calculations may be performed using appropriate equations or computation tools, such as finite-element analysis, known in the art. For the design shown in FIG. 10, the bending moment across the channel width is calculated as:

$$M = \frac{W}{12}(6Lx - L^2 - 6x^2)$$

Where,
M=Bending moment, N-m
W=Force per unit length, N/m
L=Overall width of the channel, m
x=Distance from supported edge, m For a rectangular wall with thickness, t and unit length (length=1.0 m the direction perpendicular to the channel rectangular cross section):
$S_b$, Bending Stress, Pa=Mc/I
M=Bending moment, N-m
c=distance from the center to the outermost fiber of the wall.
c=t/2 for a rectangular wall, m
I=Moment of Inertia of the rectangular wall, $m^4$=(1.0) $t^3$/12
t=Wall Thickness, m $$S_b = \frac{W}{12}(6Lx - L^2 - 6x^2)(6/t^2) = \frac{W}{2}(6Lx - L^2 - 6x^2)(1/t^2)$$

These dimensions are illustrated in FIG. 12.

Example

Channel Width, L=0.005 m
x is the distance in the direction of the Channel Width from x=0 to x=L, m
Wall Thickness of Straight Rectangular Wall Example, $t_1$=0.0005 m
Wall Thickness of Stepped Rectangular Wall Example from x=0 to x=$x_1$ and x=$x_2$ to x=L, $t_1$=0.005 m
Wall Thickness of Stepped Rectangular Wall Example from x=$x_1$ to x=$x_2$, $t_2$=0.000381 m
$x_1$=0.00125 m
$x_2$=0.00375 m
Differential Pressure Load, Uniform on Wall, P=2,500,000 Pa
For a rectangular beam of unit depth, loaded with uniform pressure, P, Pa: W=P (1.0 m)=P $$S_b = \frac{P}{2}(6Lx - L^2 - 6x^2)\left(\frac{1}{t^2}\right)$$

Calculating the Bending Stress comparing absolute value of stress, since the tension (+) and compression (−) stress is equal magnitude on opposite sides of the wall:
Stress in both the straight and stepped wall is maximum of 125,000,000 Pa at x=0 and x=L.
Stress from $x_1$ to $x_2$ is highest at x=L/2, where $S_b$=62,500,000 Pa for the straight wall.
Stress from $x_1$ to $x_2$ is highest at x=L/2, where $S_b$=107,639,104 Pa for the stepped wall, which reflects the use of this invention.
Even though the stress is higher at x=L/2 for the stepped wall, it is still lower than the maximum of 125,000,000 Pa at x=0 and x=L. See FIG. 13.

What is claimed:

1. A laminated microchannel apparatus comprising:
a first layer comprising a plurality of first microchannels;
a second layer comprising a plurality of second microchannels;
wherein the first layer is adjacent to the second layer;
wherein the plurality of first microchannels are adjacent to and parallel with the plurality of second microchannels;
wherein at least one of the first microchannels is aligned with a second microchannel to form a microchannel pair; wherein each microchannel in a microchannel pair is aligned such that a straight line can be drawn through the structural material on at least one side, in a direction that is perpendicular to the microchannel length;
wherein each of the first microchannels and the second microchannels have parallel lengths that run in same direction; wherein each microchannel has one microchannel edge at each end along the width direction;
the first microchannel and the second microchannel in each microchannel pair are separated by a microchannel wall;
wherein the microchannel wall is defined to be coextensive with the second microchannel such that the width of the microchannel wall in each microchannel pair is defined as having same the width as the second microchannel;
wherein the central region of the microchannel wall has an average thickness that is less than the average thickness of the edges of the microchannel wall;
wherein, if the first and second microchannels are pressurized to different pressures, wherein the maximum bending stress in the central region of the microchannel wall is between 50% and 100% of the maximum bending stress at the edges of the microchannel wall; and further wherein the apparatus possesses one or more of the following characteristics:
the central region of the microchannel wall is indented on both major surfaces;
the thickness of the microchannel wall at all points in the central 20% of the wall's width is greater than at other points in the central region of the microchannel wall; and
in a portion of the wall where the central region of the microchannel wall is thinner than the edge of the microchannel wall, one or both of the microchannels in the microchannel pair have constant cross sections for a length of at least 2 cm.

2. The apparatus of claim 1 wherein each of the first microchannels is aligned with each of the second microchannels in a microchannel pair such that each microchannel in a microchannel pair has the same position on the horizontal axis such that the structural material on at least one side, at each edge in a microchannel pair in the horizontal direction, forms a vertical pillar of support material.

3. The apparatus of claim 1 wherein, if the first and second microchannels are pressurized to different pressures, wherein the maximum bending stress in the central region of the microchannel wall is between 60% and 90% of the maximum bending stress at the edges of the microchannel wall.

4. The apparatus of claim 1 wherein the second microchannels each have a height at all points on the microchannel edges that is at least 20% less than a height at a point in the central region (middle 80% of the channel width) of the second microchannel; and wherein the first derivative of the height (expressed as a function of the width) of each of the second microchannels along their width is not constant, that is, changes at least once, and the second derivative of the height of the each of the second microchannels along the width is also not constant; and wherein the second microchannels do not contain surface features and also do not contain capillary features.

5. The apparatus of claim 1 wherein the second microchannels each have a height at all points on the microchannel edges that is at least 20% less than a height at a point in the central region (middle 80% of the channel width) of the second microchannel; and wherein the first derivative of the height (expressed as a function of the width) of each of the second microchannels along their width is not constant, that is, changes at least once, and the second derivative of the height of the each of the second microchannels along the width is also not constant; and wherein the probability distribution function (a function of the probability of occurrence of different heights in the given channel) of the height of each of the second microchannels (arranged in the order of increasing heights) is non-monotonic and has a multi-modal distribution with at least two distinct modes in the height distribution function (that is, there are at least two unique heights in the channel).

6. The apparatus of claim 1 wherein there is a discontinuous change in the height of a second microchannel.

7. A system comprising the apparatus of claim 1 wherein a first fluid is present in the first microchannels at a first pressure and a second fluid is present in the second microchannels at a second pressure; wherein the first and second pressures are different.

8. A method of conducting a differential pressure process in the apparatus of claim 1, comprising:
flowing a first fluid through the first plurality of microchannels at a first pressure;
flowing a second fluid through the second plurality of microchannels at a second pressure;
wherein the first and second pressures are different;
and conducting a unit operation on the fluid in the second plurality of microchannels.

9. The apparatus of claim 1 wherein the thickness of the microchannel wall at all points in the central 20% of the wall's width is greater than at other points in the central region of the microchannel wall.

10. A laminated microchannel apparatus comprising:
a first layer comprising a plurality of first microchannels;
a second layer comprising a plurality of second microchannels;
wherein the first layer is adjacent to the second layer;
wherein the plurality of first microchannels are adjacent to and parallel with the plurality of second microchannels;
wherein at least one of the first microchannels is aligned with a second microchannel to form a microchannel pair; wherein each microchannel in a microchannel pair is aligned such that (a straight line can be drawn through) the structural material on at least one side (in a direction that is perpendicular to the microchannel length);
wherein each the first microchannels and the second microchannels have parallel lengths that run in same direction; wherein each microchannel has one microchannel edge at each end along the width direction;
wherein the second microchannels each have a height at all points on the microchannel edges that is at least 20% less than a height at a point in the central region (middle 80% of the channel width) of the second microchannel; and
wherein the first derivative of the height (expressed as a function of the width) of each of the second microchannels along their width is not constant, that is, changes at least once, and the second derivative of the height of the each of the second microchannels along the width is also not constant; and
wherein the second microchannels do not contain surface features and also do not contain capillary features; and
wherein, if the first and second microchannels are pressurized to different pressures, wherein the maximum bending stress in the central region of the microchannel wall is between 60% and 90% of the maximum bending stress at the edges of the microchannel wall.

11. The apparatus of claim 10 wherein the second microchannels each have a height at all points on the microchannel edges that is at least 20% less than a height at a point in the middle 50% of the channel width of the second microchannel.

12. The apparatus of claim 10 wherein each of the first microchannels is aligned with each of the second microchannels in a microchannel pair such that each microchannel in a microchannel pair has the same position on the horizontal axis such that the structural material on at least one side, at each edge in a microchannel pair in the horizontal direction, forms a vertical pillar of support material.

13. The apparatus of claim 10 wherein the probability distribution function of the height of each of the second microchannels (arranged in the order of increasing heights) is non-monotonic and has a multi-modal distribution with at least two distinct modes in the height distribution function (that is, there are at least two unique heights in the channel).

14. The apparatus of claim 13 wherein, in the probability distribution function, the contribution of any one height mode does not exceed 95% of the total modes of heights within the channel.

15. A laminated microchannel apparatus comprising:
a first layer comprising a plurality of first microchannels;
a second layer comprising a plurality of second microchannels;
wherein the first layer is adjacent to the second layer;
wherein the plurality of first microchannels are adjacent to and parallel with the plurality of second microchannels;
wherein at least one of the first microchannels is aligned with a second microchannel to form a microchannel pair; wherein each microchannel in a microchannel pair is aligned such that (a straight line can be drawn through) the structural material on at least one side (in a direction that is perpendicular to the microchannel length);
wherein each the first microchannels and the second microchannels have parallel lengths that run in same direction; wherein each microchannel has one microchannel edge at each end along the width direction;
wherein the second microchannels each have a height at all points on the microchannel edges that is at least 20% less than a height at a point in the central region (middle 80% of the channel width) of the second microchannel; and
wherein the first derivative of the height (expressed as a function of the width) of each of the second microchannels along their width is not constant, that is, changes at least once, and the second derivative of the height of the each of the second microchannels along the width is also not constant; and
wherein the probability distribution function (a function of the probability of occurrence of different heights in the given channel) of the height of each of the second microchannels (arranged in the order of increasing heights) is non-monotonic and has a multi-modal distribution with at least three distinct modes in the height distribution function (that is, there are at least three unique heights in the channel).

16. The apparatus of claim 15 wherein the second microchannels do not contain surface features and also do not contain capillary features.

17. The apparatus of claim 15 wherein the second microchannels comprise surface features.

18. The apparatus of claim 15 wherein the central region is between 25% and 75% of width of the second microchannels.

19. A prebonded structure comprising sheets that are stacked to form the structure of claim 15.

* * * * *